US008787242B2

(12) United States Patent
Ho et al.

(10) Patent No.: US 8,787,242 B2
(45) Date of Patent: Jul. 22, 2014

(54) HEADER COMPRESSION FOR RELAY NODES

(75) Inventors: Sai Yiu Duncan Ho, San Diego, CA (US); Fatih Ulupinar, San Diego, CA (US); Parag Arun Agashe, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 341 days.

(21) Appl. No.: 12/891,943

(22) Filed: Sep. 28, 2010

(65) Prior Publication Data

US 2011/0249610 A1 Oct. 13, 2011

Related U.S. Application Data

(60) Provisional application No. 61/259,016, filed on Nov. 6, 2009.

(51) Int. Cl.
*H04B 7/14* (2006.01)

(52) U.S. Cl.
USPC .......................................................... 370/315

(58) Field of Classification Search
None
See application file for complete search history.

(56) References Cited

U.S. PATENT DOCUMENTS

| | | | | |
|---|---|---|---|---|
| 6,542,504 | B1* | 4/2003 | Mahler et al. | 370/392 |
| 6,967,964 | B1* | 11/2005 | Svanbro et al. | 370/437 |
| 7,035,287 | B2* | 4/2006 | Tourunen et al. | 370/477 |
| 7,558,882 | B2* | 7/2009 | Walsh et al. | 709/247 |
| 2004/0039830 | A1* | 2/2004 | Zhang et al. | 709/230 |
| 2005/0094670 | A1* | 5/2005 | Kim | 370/477 |
| 2006/0104266 | A1* | 5/2006 | Pelletier et al. | 370/389 |
| 2007/0242703 | A1 | 10/2007 | Pelletier et al. | |
| 2009/0086707 | A1* | 4/2009 | Meylan | 370/349 |
| 2009/0190522 | A1* | 7/2009 | Horn et al. | 370/315 |
| 2009/0238185 | A1* | 9/2009 | Horn et al. | 370/392 |

FOREIGN PATENT DOCUMENTS

| | | |
|---|---|---|
| WO | WO03003668 A1 | 1/2003 |
| WO | WO2006052183 A1 | 5/2006 |

OTHER PUBLICATIONS

International Search Report and Written Opinion -PCT/US2010/055741, International Search Authority—European Patent Office—Mar. 7, 2011.
Priyanka Rawat, et al., "Optimizing the Use of Robust Header Compression Profiles in NEMO Networks", Networking, 2008. ICN 2008, Seventh International Conference on IEEE Piscataway, NJ, USA, Apr. 13, 2008, pp. 150-155, XP031246489, ISBN: 978-0-7695-3106-9 p. 151, left-hand column, line 38—p. 153, right-hand column, line 17 p. 154, right-hand column, line 10—p. 155, left-hand column, line 8; figures 2,3.
Taiwan Search Report—TW099138157—TIPO—Jun. 7, 2013.

* cited by examiner

*Primary Examiner* — Yong Zhou
(74) *Attorney, Agent, or Firm* — Michael J. DeHaemer, Jr.

(57) ABSTRACT

Methods and apparatuses are provided that facilitate compressing packet headers for communicating among access points. An access point can advertise compression profiles to one or more disparate access points, and the one or more disparate access points can select at least one compression profile for compressing/decompressing packets related to the one or more disparate access points and/or devices communicating therewith. The one or more disparate access points can notify the access point of the selected compression profile, a compression context identifier, and/or static data related to identifying associated packets. In this regard, the access point can compress packets that have the associated static data according to the compression profile and compression context identifier. Similarly, the access point can decompress packets from the one or more disparate access points based on the compression context identifier.

61 Claims, 14 Drawing Sheets

HEADER COMPRESSION FOR RELAY NODES

CLAIM OF PRIORITY UNDER 35 U.S.C. §119

The present application for patent claims priority to Provisional Application No. 61/259,016 entitled "HEADER COMPRESSION OF IP/UDP/GTP HEADERS IN THE UN INTERFACE OF THE LTE RELAY ARCHITECTURE" filed Nov. 6, 2009, and assigned to the assignee hereof and hereby expressly incorporated by reference herein.

BACKGROUND

1. Field

The following description relates generally to wireless communications, and more particularly to routing packets among multiple access points.

2. Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), evolution data optimized (EV-DO), etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations may be established via single-input single-output (SISO) systems, multiple-input single-output (MISO) systems, multiple-input multiple-output (MIMO) systems, and so forth. Access points, however, can be limited in geographic coverage area as well as resources such that mobile devices near edges of coverage and/or devices in areas of high traffic can experience degraded quality of communications from an access point.

Relay nodes can be provided to expand network capacity and/or coverage area by facilitating communication between mobile devices and access points. For example, a relay node can establish a backhaul link with a donor access point, which can provide access to a number of other relay nodes, and the relay node can establish an access link with one or more mobile devices or additional relay nodes to facilitate communicating with the donor access point. A donor access point can communicate directly with a core network, for example, over a backhaul link and the relay nodes can thus provide various downstream devices and/or other relay nodes with access to the donor access point (e.g., to communicate with the core network). Thus, there can be multiple relay nodes in a communications path between a mobile device and access point. In certain relay node configurations (e.g., for internet protocol (IP) relay nodes), each relay node can add a header to a received packet to facilitate routing the received packet among the various relay nodes and/or among core network components. Similarly, a given responding packet can include various headers to be processed at each relay node to route the packet to a device related to the received packet. The various headers result in additional data transmitted between each node in a communications path, which can impact data throughput in the wireless network.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more embodiments and corresponding disclosure thereof, various aspects are described in connection with facilitating compressing protocol headers to provide efficient communication among relay nodes. In particular, for example, communications related to a relay node or another relay or device communicating therewith can utilize similar information in one or more protocol headers for each communication. This information, which can be static over a period of time, can be compressed in the communications to save overhead required to transmit the information in each header. For example, a relay node can select a compression profile from a set of compression profiles advertised by an access point (e.g., a donor access point) and can notify the access point of the selected compression profile. In addition, the relay node can communicate a compression context identifier and/or one or more parameters that facilitate identifying a header to compress according to the selected compression profile to the access point.

In this regard, for example, the access point can compress received headers, having the one or more parameters, according to the compression profile, and can indicate the compression context identifier when transmitting the compressed headers to the relay node. Thus, the relay node can decompress the compressed headers based at least in part on the compression context identifier. Similarly, the relay node can compress received headers, having the one or more parameters, according to the compression profile, and can indicate the compression context identifier when transmitting the compressed headers to the access point. The access point can, thus, decompress the compressed headers based at least in part on the compression context identifier.

According to an example, a method for wireless communication is provided that includes receiving one or more available compression profiles from an upstream access point and selecting a compression profile from the one or more available compression profiles. The method further includes associating the compression profile with a compression context identifier and transmitting an indication of the compression profile, the compression context identifier, and static data for identifying one or more headers, to the upstream access point.

In another aspect, an apparatus for compressing packet headers is provided that includes at least one processor configured to obtain indications of one or more available compression profiles from an upstream access point and determine a compression profile based at least in part on the indications of one or more available compression profiles. The at least one processor is further configured to correlate the compression profile with a compression context identifier and static data for identifying one or more routing headers and transmit an indication of the compression profile, the compression context identifier, and the static data to the upstream access point. In addition, the wireless communications apparatus includes a memory coupled to the at least one processor.

In yet another aspect, an apparatus for compressing packet headers is provided that includes means for selecting a compression profile from one or more available compression profiles advertised at an upstream access point and means for associating the compression profile with a compression context identifier. The apparatus further includes means for transmitting an indication of the compression profile, the compression context identifier, and static data for identifying one or more headers, to the upstream access point.

Still, in another aspect, a computer-program product is provided for compressing packet headers that includes a computer-readable medium having code for causing at least one computer to obtain indications of one or more available compression profiles from an upstream access point and code for causing the at least one computer to determine a compression profile based at least in part on the indications of one or more available compression profiles. The computer-readable medium further includes code for causing the at least one computer to correlate the compression profile with a compression context identifier and static data for identifying one or more routing headers and code for causing the at least one computer to transmit an indication of the compression profile, the compression context identifier, and the static data to the upstream access point.

Moreover, in an aspect, an apparatus for compressing packet headers is provided that includes a compression profile selecting component for determining a compression profile from one or more available compression profiles advertised at an upstream access point and a compression context generating component for associating the compression profile with a compression context identifier. The apparatus further includes a compression parameter specifying component for transmitting an indication of the compression profile, the compression context identifier, and static data for identifying one or more headers, to the upstream access point.

According to another example, a method for wireless communication is provided that includes signaling one or more compression profiles available for compressing packet headers and receiving an indication of a compression profile in the one or more compression profiles, a compression context identifier, and static data. The method also includes associating the compression context identifier with the static data and the compression profile to facilitate compressing or decompressing packet headers.

In another aspect, an apparatus for compressing packet headers is provided that includes at least one processor configured to signal one or more compression profiles available for compressing packet headers and obtain an indication of a compression profile in the one or more compression profiles, a compression context identifier, and static data. The at least one processor is further configured to associate the compression context identifier with the static data and the compression profile to facilitate compressing or decompressing packet headers. In addition, the wireless communications apparatus includes a memory coupled to the at least one processor.

In yet another aspect, an apparatus for compressing packet headers is provided that includes means for signaling one or more compression profiles available for compressing packet headers. The apparatus further includes means for receiving an indication of a compression profile in the one or more compression profiles, a compression context identifier, and static data.

Still, in another aspect, a computer-program product is provided for compressing packet headers that includes a computer-readable medium having code for causing at least one computer to signal one or more compression profiles available for compressing packet headers and code for causing the at least one computer to obtain an indication of a compression profile in the one or more compression profiles, a compression context identifier, and static data. The computer-readable medium further includes code for causing the at least one computer to associate the compression context identifier with the static data and the compression profile to facilitate compressing or decompressing packet headers.

Moreover, in an aspect, an apparatus for compressing packet headers is provided that includes a compression advertising component for signaling one or more compression profiles available for compressing packet headers, and a compression parameter receiving component for obtaining an indication of a compression profile in the one or more compression profiles, a compression context identifier, and static data.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
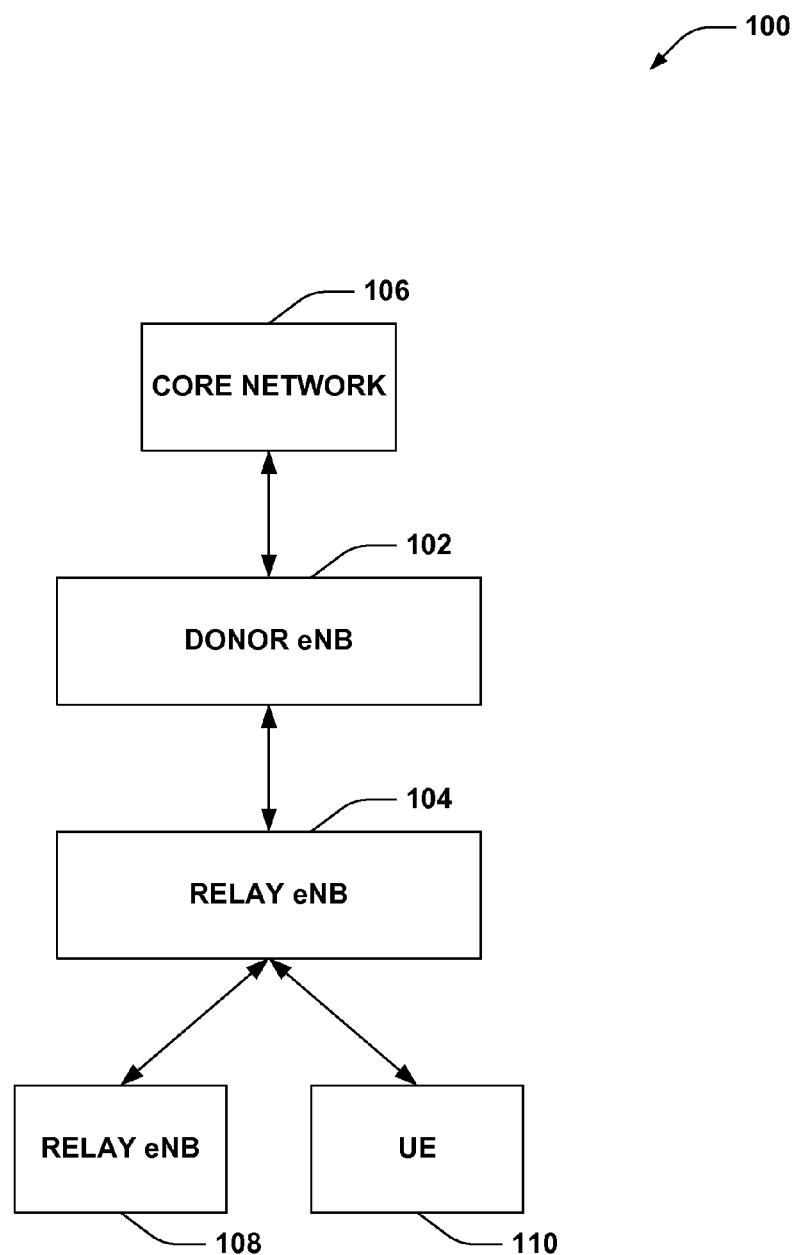
FIG. 1 is an illustration of an example wireless communications system that facilitates providing relays for wireless networks.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As described further herein, header compression is provided for headers related to routing packets among multiple relay nodes in a wireless communication system. In an example, a first node can advertise compression capabilities, such as one or more compression profiles that can be used for compressing headers communicated to the first node. A second node communicating with the first node can select an advertised compression profile for compressing headers with one or more static data values in the header (e.g., a network address, routing address, or other identifier). In one example, the second nodes can additionally generate a context identifier for subsequently identifying headers compressed by the first node. For example, the context identifier can be a string or other variable generated (e.g., randomly, pseudo-randomly based on an identifier, according to a pattern, and/or the like) for associating compressed headers to related static data, compression profiles, etc. In this regard, the second node can provide an indication of the selected compression profile, the context identifier, and/or the one or more static data values to the first node.

Upon receiving a packet for communicating to the second node, for example, the first node can determine whether header compression parameters have been provided by the second node. If so, for example, the first node can apply the selected compression profile to a header of the packet, indicate a context identifier related to one or more static data values in the header, and transmit the packet with the compressed header to the second node. The second node, upon receiving the packet, can decompress the header based at least in part on associating the context identifier with one or more of the static data values. Similarly, once the second node has indicated the selected compression profile, context identifier, and/or one or more associated static data values to the first node, the second node can compress headers of packets for transmitting to the first node, and the first node can similarly decompress the headers based at least in part on associating a context identifier in the compressed header to the one or more associated static data values.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, evolved Node B (eNB), or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Referring to FIG. 1, a wireless communication system 100 is illustrated that facilitates providing relay functionality in wireless networks. System 100 includes a donor eNB 102 that provides one or more relay eNBs, such as relay eNB 104, with access to a core network 106. Similarly, relay eNB 104 can provide one or more disparate relay eNBs, such as relay eNB 108, or UEs, such as UE 110, with access to the core network 106 via donor eNB 102. Donor eNB 102, which can also be referred to as a cluster eNB, can communicate with the core network 106 over a wired or wireless backhaul link, which can be an LTE or other technology backhaul link. In one example, the core network 106 can be a 3GPP LTE or similar technology network.

Donor eNB 102 can additionally provide an access link for relay eNB 104, which can also be wired or wireless, LTE or other technologies, and the relay eNB 104 can communicate with the donor eNB 102 using a backhaul link over the access link of the donor eNB 102. Relay eNB 104 can similarly provide an access link for relay eNB 108 and/or UE 110, which can be a wired or wireless LTE or other technology link. In one example, donor eNB 102 can provide an LTE access link, to which relay eNB 104 can connect using an LTE backhaul, and relay eNB 104 can provide an LTE access link to relay eNB 108 and/or UE 110. Donor eNB 102 can connect to the core network 106 over a disparate backhaul link technology. Relay eNB 108 and/or UE 110 can connect to the relay eNB 104 using the LTE access link to receive access to core network 106, as described. A donor eNB and connected relay eNBs can be collectively referred to herein as a cluster.

According to an example, relay eNB 104 can connect to a donor eNB 102 at the link layer (e.g., media access control (MAC) layer), transport layer, application layer, and/or the like, as would a UE in conventional LTE configurations. In this regard, donor eNB 102 can act as a conventional LTE eNB at the link layer, transport layer, application layer, etc, or related interface (e.g., user-to-user (Uu), such as E-UTRA-Uu, user-to-network (Un), such as EUTRA-Un, etc.), to support the relay eNB 104. In addition, relay eNB 104 can appear to UE 110 as a conventional eNB in LTE configurations at the link layer, transport layer, application layer, and/or the like, such that UE 110 can connect to relay eNB 104 at the link layer, transport layer, application layer, etc., as it would a conventional eNB in LTE, for example. In addition, relay eNB 104 can configure procedures for resource partitioning between access and backhaul link, interference management, idle mode cell selection for a cluster, and/or the like. It is to be appreciated that relay eNB 104 can connect to additional donor eNBs, in one example.

Thus, for example, relay eNB 104 can establish a connection with donor eNB 102 to receive access to one or more components in core network 106 (such as a mobility management entity (MME), serving gateway (SGW), packet data network (PDN) gateway (PGW), etc.). In an example, relay eNB 104 can obtain an internet protocol (IP) address from a PGW/SGW in the core network 106 (e.g., via donor eNB 102) for communicating therewith. In addition, UE 110 can establish a connection with relay eNB 104 to receive access to one or more similar components in core network 106. In this regard, for example, UE 110 can communicate IP packets to relay eNB 104 for providing to core network 106. Relay eNB 104 can obtain the IP packets, associate one or more additional headers with the packets related to relay eNB 104 (e.g., include the headers in the packets), and provide the packets to donor eNB 102. The additional headers can include an IP or user datagram protocol (UDP)/IP header related to relay eNB 104 and a corresponding component of core network 106, a general packet radio service (GPRS) tunneling protocol (GTP) header or similar header to facilitate routing of the packet to the component of core network 106 and/or routing of a responding packet to relay eNB 104, etc. Thus, donor eNB 102 can route the packets to a component of core network 106 related to relay eNB 104 (e.g., adding another header for donor eNB 102 and transmitting to core network 106).

Components of core network 106, for example, can route the packets within the core network 106 according to the various IP headers. Moreover, for example, core network 106 can construct packets for providing to UE 110 to include UDP/IP headers, GTP headers, etc., related to routing the packet to UE 110 through relay eNB 104. In an example, core network 106 can include an IP header related to UE 110 with the packet, as well as a UDP/IP and/or GTP header related to relay eNB 104, and/or similar header(s) related to donor eNB 102. Core network 106 can forward the packet with the headers to donor eNB 102. Donor eNB 102 can obtain the packet, remove the UDP/IP and/or GTP header related to donor eNB 102, and forward the packet to relay eNB 104 based on the next GTP header. Relay eNB 104 can similarly remove the header(s) related to relay eNB 104, in one example, and relay eNB 104 can forward the packet to UE 110 based on the remaining IP header or another header. Though one relay eNB 104 is shown between UE 110 and donor eNB 102, it is to be appreciated that additional relay eNBs can exist, and UDP/IP and/or GTP headers can be added to uplink and downlink packets, as described, for each relay eNB to facilitate packet routing through the relay eNBs and/or related core network 106 PGW/SGWs.

The additional headers, for example, can introduce overhead when transmitting packets over a radio interface (e.g., between donor eNB 102 and relay eNB 104, relay eNB 104 and relay eNB 108, etc.). Thus, for example, donor eNB 102 can compress downlink packets before transmitting to relay eNB 104, and relay eNB 104 can similarly compress downlink packets before transmitting to relay eNB 108 or UE 110. Similarly, relay eNB 104 can compress uplink packets before transmitting to donor eNB 102, and relay eNB 108 can similarly compress uplink packets before sending to relay eNB 104, etc. For example, packet headers related to relay eNB 104 can have static fields or data, such as a tunnel endpoint identifier (TEID) related to relay eNB 104, an IP address assigned to relay eNB 104 (e.g., by a corresponding PGW or SGW), and/or the like, that are substantially the same for a plurality of packets communicated over a related radio bearer. In addition, however, the packets can have non-static data that can change for a given packet over the radio bearer, such as a packet length, sequence number (e.g., GTP sequence number), and/or the like. In this regard, at least the static fields and/or other static data in the headers can be compressed for packets related to relay eNB 104 to mitigate sending the entire static data, which can decrease bandwidth required to forward packets thereto.

In an example, donor eNB 102 can advertise compression capability for GTP or similar routing headers. For example, donor eNB 102 can signal one or more compression profiles that can be used for compressing headers of packets sent to/from donor eNB 102. A compression profile, for example, can relate to a set of instructions for compressing/decompressing static and/or non-static data in a header. Relay eNB 104, in this example, can select a compression profile, and can notify donor eNB 102 of the selected profile. In this regard, donor eNB 102 can utilize the selected profile to compress headers of packets transmitted to relay eNB 104 and/or the decompress headers of packets received from relay eNB 104. Moreover, for example, relay eNB 104 can provide one or more static data values of headers to be compressed to donor eNB 102 along with a corresponding compression context identifier. Thus, for example, upon receiving a packet from core network 106, donor eNB 102 can determine whether the packet has a header with corresponding static data values related to those received from relay eNB 104. If so, donor eNB 102 can compress the header according to the indicated compression profile. Donor eNB 102 can then transmit the packet with compressed header to relay eNB 104 and can indicate the compression context identifier (e.g., in the compressed header or another header of the packet) to the relay eNB 104.

In this example, based at least in part on the compression context identifier, relay eNB 104 can determine the static values associated with the compressed header, effectively decompressing the compressed header, for example. Relay eNB 104, for example, can utilize the static data associated with the compression context identifier, as well as non-static data in the compressed header, to communicate the packet to a downstream node (e.g., relay eNB 108, UE 110, etc.). If donor eNB 102 cannot match static data in the GTP or similar routing header to static values received from relay eNB 104, where the packet relates to relay eNB 104 or a device communicating therewith, it can send the packet to relay eNB 104 without compressing the header. In another example, once relay eNB 104 notifies donor eNB 102 of a selected compression profile, static values, a corresponding compression context identifier, etc., relay eNB 104 can compress a header of a packet received from a downstream node (e.g., relay eNB 108, UE 110, etc.) for donor eNB 102 using the selected compression profile. Relay eNB 104, in this regard, can indicate the compression context identifier in the packet and can send the packet to donor eNB 102. Donor eNB 102 can similarly decompress the compressed header based at least in part on identifying one or more static data values related to the compression context identifier.

Moreover, in either case for example, it is to be appreciated that non-static data values in the header can be compressed/decompressed as well, as described further herein. In addition, for example, relay eNB 104 can create the compression context identifier and/or associate the compression context identifier to the one or more static data values according to a sequence, a random sequence, a pseudo-random sequence (e.g., based at least in part on one or more parameters of the packet, header, or relay eNB 104), and/or the like. In addition, the compression context identifier can be a number of bits that can be less than a number of bits of the packet occupied by the one or more related static data values.

Figure 2:
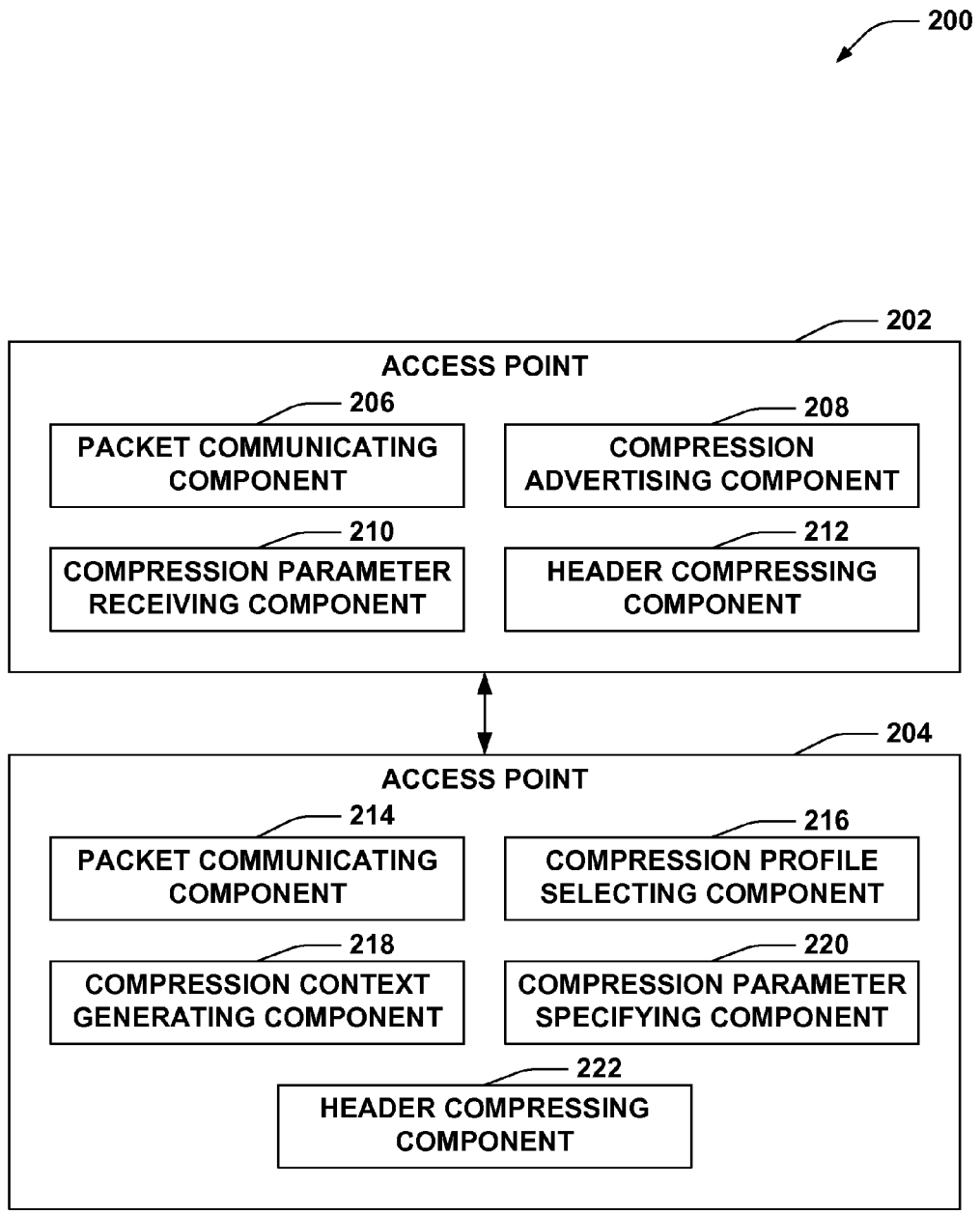
FIG. 2 is an illustration of an example wireless communications system that compresses packet headers for efficient communications among relay nodes.

Turning now to FIG. 2, an example wireless communication system 200 that facilitates compressing packet headers for efficient communication thereof is illustrated. System 200 includes an access point 202 that communicates with another access point 204 (and/or other access points). Thus, for example, access point 202 can be a donor access point where access point 204 is a relay node, access point 204 can be a donor access point where access point 202 is a relay node, access points 202 and 204 can both be relay nodes, etc. In addition, it is to be appreciated that access point 204 can comprise the components of access point 202 to provide similar functionality, in one example, and vice versa. Moreover, access points 202 and 204 can each be a macrocell access point, femtocell access point, picocell access point, mobile base station, and/or the like, and can communicate over a wireless connection (e.g., using a E-UTRA-Uu interface, E-UTRA-Un interface, and/or the like).

Access point 202 comprises a packet communicating component 206 that receives a packet from one or more devices in a wireless network (not shown) and transmits the packet, or a compressed version thereof, to one or more access points, and/or receives a packet from the one or more access points and transmits the packet to one or more wireless network components. Access point 202 also comprises a compression advertising component 208 that signals one or more compression profiles or other parameters supported by access point 202, a compression parameter receiving component 210 that obtains one or more parameters related to compressing headers of packets for one or more access points, and a header compressing component 212 that compresses one or more packets for transmitting to the one or more access points or decompresses one or more packets from the one or more access points according to the one or more parameters.

Access point 204 comprises a packet communicating component 214 that receives a packet from an access point and transmits the packet, or a decompressed version thereof, to one or more disparate devices in a wireless network (not shown), and/or receives a packet from the one or more disparate devices and transmits the packet to the access point. Access point 204 also comprises a compression profile selecting component 216 that determines a compression profile advertised by one or more access points to apply to one or more packet headers for transmission to the one or more access points, and a compression context generating component 218 that creates a compression context identifier for associating to one or more compressed packet headers. Access point 204 additionally can comprise a compression parameter specifying component 220 that indicates one or more parameters for associating to the compression context identifier for subsequently decompressing the one or more compressed packet headers, and a header compressing component 222 that compresses or decompresses one or more subsequent packets based at least in part on a compression context identifier and the one or more parameters.

According to an example, compression advertising component 208 can signal information regarding one or more supported compression profiles (e.g., using radio resource control (RRC) layer or similar signaling). For example, the supported compression profiles can relate at least partially to profiles for compressing routing protocol headers, as described above, for communicating to/from a disparate access point. Compression profile selecting component 216 can determine the supported compression profiles based at least in part on the signal, and can select a compression profile for compressing one or more packet headers for communicating with access point 202. As described, for example, the one or more packet headers can relate to routing headers, such as GTP headers, and/or the like, which can include static data, such as an address related to access point 204 or a device served by access point 204, a TEID related to access point 204, etc., as well as dynamic or non-static data, such as sequence numbers, and/or the like.

In addition, for example, compression context generating component 218 can create a compression context identifier for associating with the compression profile for compressing packets related to one or more downstream nodes, such as another access point, UE, and/or the like. In this regard, compression parameter specifying component 220 can determine one or more parameters for associating to the compression context identifier to facilitate identifying the one or more parameters upon receiving a packet that includes the compression context identifier. For example, compression parameter specifying component 220 can determine an address of access point 204, an address for the one or more downstream nodes, a TEID related to access point 204, a protocol type or version, and/or the like. Compression context generating component 218 can associate the one or more parameters with the compression context identifier and/or compression profile (e.g., in a compression context).

Thus, compression parameter specifying component 220 can indicate the one or more parameters, compression context identifier, and/or compression profile to access point 202 (e.g., via RRC or similar signaling). Compression parameter receiving component 210 can obtain the one or more parameters, compression context identifier, and/or compression profile. Compression parameter receiving component 210 can similarly associate the compression context identifier to the selected compression profile, one or more parameters, etc. For instance, compression parameter receiving component 210 can store the compression context identifier, compression profile, and/or one or more parameters in a compression context. For example, the compression contexts can be stored in a database or some other relational or indexed storage such that the compression profile and/or one or more parameters can be retrieved based on the compression context identifier. In one example, compression parameter receiving component 210 can acknowledge receipt of the parameters to access point 204.

Furthermore, for example, packet communicating component 206 can obtain a packet from an upstream network component (not shown) that relates to access point 204. Compression parameter receiving component 210 can determine whether one or more headers of the packet include static data that corresponds to the one or more parameters received from access point 204 (e.g., an address, TEID, other identifiers, protocol type, version, etc.). This can include, for example, evaluating one or more compression contexts related to access point 204 stored by compression parameter receiving component 210, as described. If so, compression parameter receiving component 210 can additionally obtain the compression context identifier and compression profile associated with the one or more parameters. Header compressing component 212, in this example, can compress the one or more headers according to the compression profile and can indicate the compression context identifier in the packet. Packet communicating component 206 can transmit the packet to access point 204.

Packet communicating component 214 can receive the packet, and header compressing component 222 can decompress the one or more compressed headers. For example, header compressing component 222 can determine the compression context identifier indicated in the packet, and compression context generating component 218 can discern which parameters are associated with the compression context identifier (e.g., based on locating a compression context corresponding to the compression context identifier). Thus, header compressing component 222 can appropriately associate the parameters with the header to effectively decompress at least a portion of the header. In addition, header compressing component 222 can decompress a portion of non-static data as well, as described further herein. In another example, where compression parameter receiving component 210 determines that a received packet does not include static data corresponding to one or more parameters received from access point 204, packet communicating component 206 can send the packet to access point 204 uncompressed. In one example, compression parameter specifying component 220 can retransmit the selected compression profile, compression context identifier, and/or one or more related parameters to access point 202 upon receiving the uncompressed packet.

In an example, compression parameter specifying component 220, upon transmitting the one or more parameters, compression context identifier, and/or compression profile to access point 202, can initialize a timer during which a packet compressed with the compression context identifier or an acknowledgement of parameter receipt is expected. If not received, compression parameter specifying component 220 can retransmit the one or more parameters, compression context identifier, and/or the compression profile to the access point 202.

Moreover, in another example, packet communicating component 214 can obtain a packet from one or more downstream nodes (e.g., a disparate access point, UE, etc.). Where compression parameter specifying component 220 indicates a selected compression profile, compression context identifier, and/or one or more parameters related to the one or more downstream nodes to access point 202, as described, header compressing component 222 can compress one or more headers of the packet received from the one or more downstream nodes for transmitting to access point 202. For example, compression context generating component 218 can determine whether one or more parameters in the one or more headers correspond to a compression context identifier. If so, header compressing component 222 can compress the one or more headers according to a previously selected compression profile related to the compression context identifier, and can indicate the compression context identifier in the packet, as described.

Packet communicating component 214 can transmit the packet to access point 202, and packet communicating component 206 can receive the packet. In this example, header compressing component 212 can determine the compression context identifier in the one or more headers, and can obtain one or more parameters related thereto from compression parameter receiving component 210, including related static data, a compression profile, and/or the like. As described, for example, the compression profile, related static data, etc., can be that received from access point 204 with the corresponding compression context identifier. In one example compression parameter receiving component 210 can have stored this information in a compression context, as described. Header compressing component 212 can decompress the one or more headers according to the compression profile (e.g., at least in part by associating the static data with the header, and/or uncompressing non-static data, as described).

In one example, header compressing component 212 and/or 222 can compress one or more headers of a packet, as described above, at least in part by removing static data from the one or more headers and including a compression context identifier in the compressed header, or another header in the packet. In this regard, as described, compression parameter specifying component 220 and/or compression parameter receiving component 210 can indicate the removed static data along with the compression context identifier to access point 202 to facilitate associating the compression context identifier with the removed static data. Thus, header compressing component 212 and/or 222 can place static data in the one or more compressed headers and/or create a new header comprising the static data and/or non-static data from the one or more compressed headers based on the compression profile. Thus, in one example, the compression profile can include instructions for decompressing the headers as well (e.g., instructions for inserting the static data in the compressed headers and/or for creating headers from static data, etc.).

Moreover, for example, header compressing component 212 and/or 222 can compress/decompress non-static data in the one or more headers as well, according to the compression profile related to the compression context identifier. In one example, for a GTP sequence number or similar data, header compressing component 212 and/or 222 can include n least significant bits of the sequence number for compressing the sequence number, where n is a positive integer. In this regard, for example, it is to be appreciated that header compressing component 212 and/or 222 can leave the GTP sequence number or similar parameter uncompressed every $2^{(n-1)}$ packets to prevent ambiguity caused when the sequence number wraps to the next number requiring an extra bit. Furthermore, in an example, compression parameter specifying component 220 can signal to access point 202 to remove or delete the compression profile indication, compression context identifier, static data, and/or other parameters communicated thereto. This can be based at least in part on access point 204 discontinuing connection to access point 202, in one example.

According to one example, compression parameter specifying component 220 can indicate an IP address of access point 204 and/or a TEID related to the access point 204 (and/or a downstream node) to access point 202 along with a compression context identifier and selected compression profile, as described. Compression parameter receiving component 210 can obtain the IP address and/or TEID and store them along with the compression context identifier and compression profile. Packet communicating component 206 can receive a packet having a format similar to the following.

| L1 | MAC | Radio Link Control (RLC) | Packet data convergence protocol (PDCP) | UDP/IP header (with IP of access point) | GTP header (with TEID of access point) | IP Packet |
|---|---|---|---|---|---|---|

In this regard, compression parameter receiving component 210 can determine whether the IP address and/or TEID relate to those received from access point 204. If so, header compressing component 212 can compress the UDP/IP and GTP headers to decrease size of the packet and thus bandwidth required to communicate the packet. For example, at least an IP address of the access point 204 and a TEID of the access point 204 can be compressed as these values can be static for the given access point 204 (e.g., at least for a period of time) over a related radio bearer with access point 202. Header compressing component 212 can compress the headers according to the selected profile related to the IP address and TEID, and can specify the corresponding compression context identifier in the packet. Packet communicating component 206 can transmit the packet and context identifier to access point 204.

Packet communicating component 214 can receive the communication from access point 202, and compression context generating component 218 can retrieve the compression context identifier therefrom. As described, compression context generating component 218 can determine one or more parameters associated to the compression context identifier, as well as the compression profile, and header compressing component 222 can accordingly decompress the header, as described. In one example, header compressing component 222 can populate the IP address and TEID associated to the compression context identifier within the header according to the compression profile. Moreover, as described, compression parameter receiving component 210 can acknowledge receipt of the parameters from access point 204. Where compression parameter specifying component 220 does not receive an acknowledgement or a compressed packet after indicating a set of parameters, compression context identifier, and/or compression profile to access point 202 within a period of time, it can resend the parameters to access point 202, for example. In either case, access point 204 can profiles the packet with the decompressed header.

Figure 3:
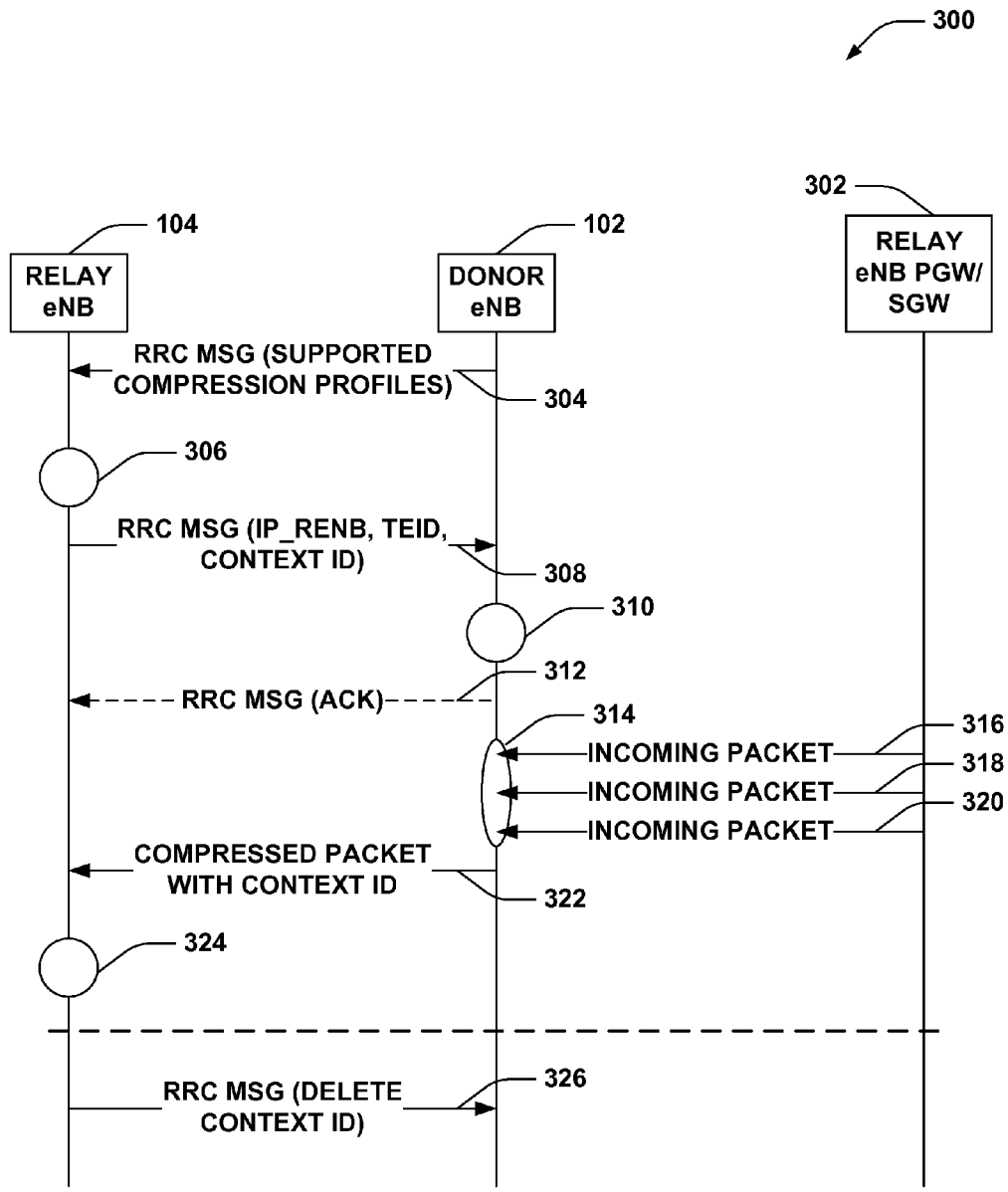
FIG. 3 is an illustration of an example wireless communications system that selects one or more advertised compression profiles for compressing packet headers.

Referring to FIG. 3, an example wireless communication system 300 for compressing and decompressing headers related to routing packets among one or more relay nodes is illustrated. System 300 includes a donor eNB 102 that provides wireless network access to relay eNB 104, as described. In addition, system 300 can include a relay eNB PGW/SGW 302. As described, relay eNB PGW/SGW 302 can be part of a core network, and donor eNB 102 can provide relay eNB 104 with access to relay eNB PGW/SGW 302. In an example, relay eNB 104 can establish connection to relay eNB PGW/SGW 302 through donor eNB 102 and can receive an IP address from relay eNB PGW/SGW 302 for communicating therewith. In addition, relay eNB PGW/SGW 302 can receive or generate a TEID related to relay eNB 104 to include in packets for relay eNB 104 when providing the packets to donor eNB 102.

For example, donor eNB 102 can transmit an RRC message 304 to relay eNB 104 advertising one or more compression profiles supported at donor eNB 102. In one example, this can be part of an attachment procedure where relay eNB 104 attaches to donor eNB 102 for communicating therewith (e.g., an S1-U setup), a device attaches to relay eNB 104 for communicating with donor eNB 102, and/or the like. At 306, relay eNB 104 can select a compression profile for compressing headers of packets communicated to donor eNB 102. In addition, for example at 306, relay eNB 104 can associate the compression profile with a compression context identifier and/or static data for subsequently identifying compressed packets and/or related static data for uncompressing the compressed packets. Additionally, as described, relay eNB 104 can transmit an RRC message 308 to donor eNB 102 that indicates an IP address, TEID, and/or similar static data that can be used to identify packets related to relay eNB 104, and a compression context identifier associated with the static data. Upon receiving this information, donor eNB 102 can start compression 310 for packets having at least a portion of the static data in one or more headers. In one example, donor eNB 102 can optionally transmit an RRC message 312 to relay eNB 104 acknowledging receipt of the static data. Where donor eNB 102 does not transmit an RRC message to acknowledge receipt, for example, relay eNB 104 can start a timer after sending RRC message 308. If it does not receive a compressed packet from donor eNB 102 before expiration of the timer, it can resend RRC message 308 to donor eNB 102.

Donor eNB 102 can obtain one or more incoming packets 316, 318, and 320 from relay eNB PGW/SGW 302 for one or more relay eNBs. At 314, donor eNB 102 can determine whether any of the packets 316, 318, or 320 have headers with at least a portion of the static data received from relay eNB 104 (e.g., IP, TEID, etc.). Thus, donor eNB 102 can at least use the static data, or a portion thereof, to identify packets related to a compression context identifier. It is to be appreciated, in one example, that donor eNB 102 can first determine whether one or more of the packets 316, 318, or 320 relates to relay eNB 104 or another relay eNB. At 314, donor eNB 102 discerns that one of the incoming packets has the static data in a header. In this regard, donor eNB 102 can determine the related compression context identifier, compress the header, and transmit the compressed packet with the context identifier 322 to relay eNB 104. Relay eNB 104 can decompress the packet based on the compression context identifier at 324, as described (e.g., based at least in part on identifying static data associated with the compression context identifier). Moreover, as described, relay eNB 104 can additionally decompress non-static data in the header as well, at 324. In addition, after a period of time or certain event (such as S1-U teardown), relay eNB 104 can cause donor eNB 102 to delete the parameters, compression context identifier, and/or related information, such as a generated compression context (e.g., by transmitting a related RRC message 326 thereto).

Figure 4:
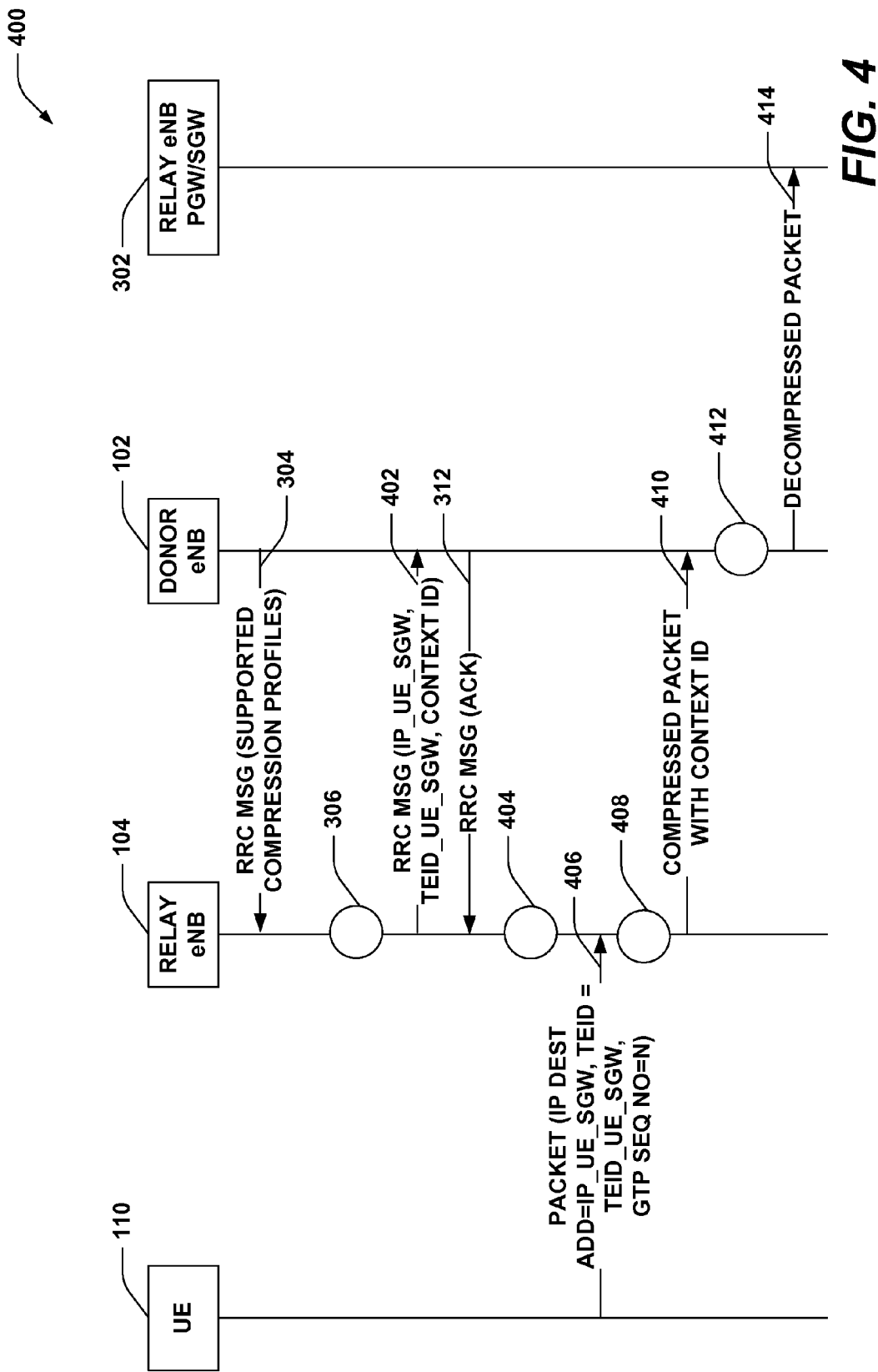
FIG. 4 is an illustration of an example wireless communications system that selects a compression profile related to compressing uplink packets.

Referring to FIG. 4, an example wireless communication system 400 for compressing and decompressing headers related to routing packets among one or more relay nodes is illustrated. System 400 includes a donor eNB 102 that provides wireless network access to relay eNB 104, as described, and a UE 110 that receives wireless network access from relay eNB 104. In addition, system 400 can include a relay eNB PGW/SGW 302. As described, relay eNB PGW/SGW 302 can be part of a core network, and donor eNB 102 can provide relay eNB 104 with access to relay eNB PGW/SGW 302. In an example, relay eNB 104 can establish connection to relay eNB PGW/SGW 302 through donor eNB 102 and can receive an IP address for communicating with relay eNB PGW/SGW 302. In addition, relay eNB PGW/SGW 302 can receive or generate a TEID related to relay eNB 104 to include in packets for relay eNB 104 when providing the packets to donor eNB 102. Furthermore, relay eNB PGW/SGW 302 can communicate packets related to UE 110 to a UE SGW (or PGW/SGW, not shown).

For example, as described, donor eNB 102 can transmit an RRC message 304 to relay eNB 104 advertising one or more compression profiles supported at donor eNB 102. At 306, relay eNB 104 can select a compression profile for compressing headers of packets communicated to donor eNB 102. Additionally, as described, relay eNB 104 can transmit an RRC message 402 to donor eNB 102 that indicates an IP address of a SGW related to UE 110, TEID of the SGW, and/or similar static data that can be used to identify packets related to UE 110, and a compression context identifier associated with the static data. For example, relay eNB 104 can obtain these parameters during an attachment procedure with UE 110. In this example UE 110 can receive the IP address and/or TEID upon registering with the UE SGW, and relay eNB 104 can obtain the IP address and TEID for forwarding to UE 110, or otherwise receive the parameters from UE 110 or donor eNB 102 (e.g., in one or more signals). Donor eNB 102 can transmit an RRC message 312 to relay eNB 104 acknowledging receipt of the static data.

At 404, relay eNB 104 can determine to start compressing packets received from UE 110 that have at least a portion of the static data in a header. Thus, relay eNB 104 can receive a packet from UE 110 that includes a header having an IP address of the UE SGW, a TEID of the UE SGW, and a GTP sequence number, n, for example. At 408, relay eNB 104 can compress at least one header of the packet according to the selected compression profile. For example, this can include removing static data from the header, as described. In addition, relay eNB can insert the compression context identifier related to the static data in the packet. Relay eNB 104 can transmit the compressed packet with the context identifier 410 to donor eNB 102. Donor eNB 102 can decompress the packet (e.g., decompress at least one compressed header) at 412 based at least in part on the context identifier, as described previously. For example, donor eNB 102 can associate static data related to the context identifier with the packet, decompress at least a portion of non-static data, and/or the like. Donor eNB 102 can transmit the decompressed packet 414 to relay eNB PGW/SGW 302.

Figure 5:
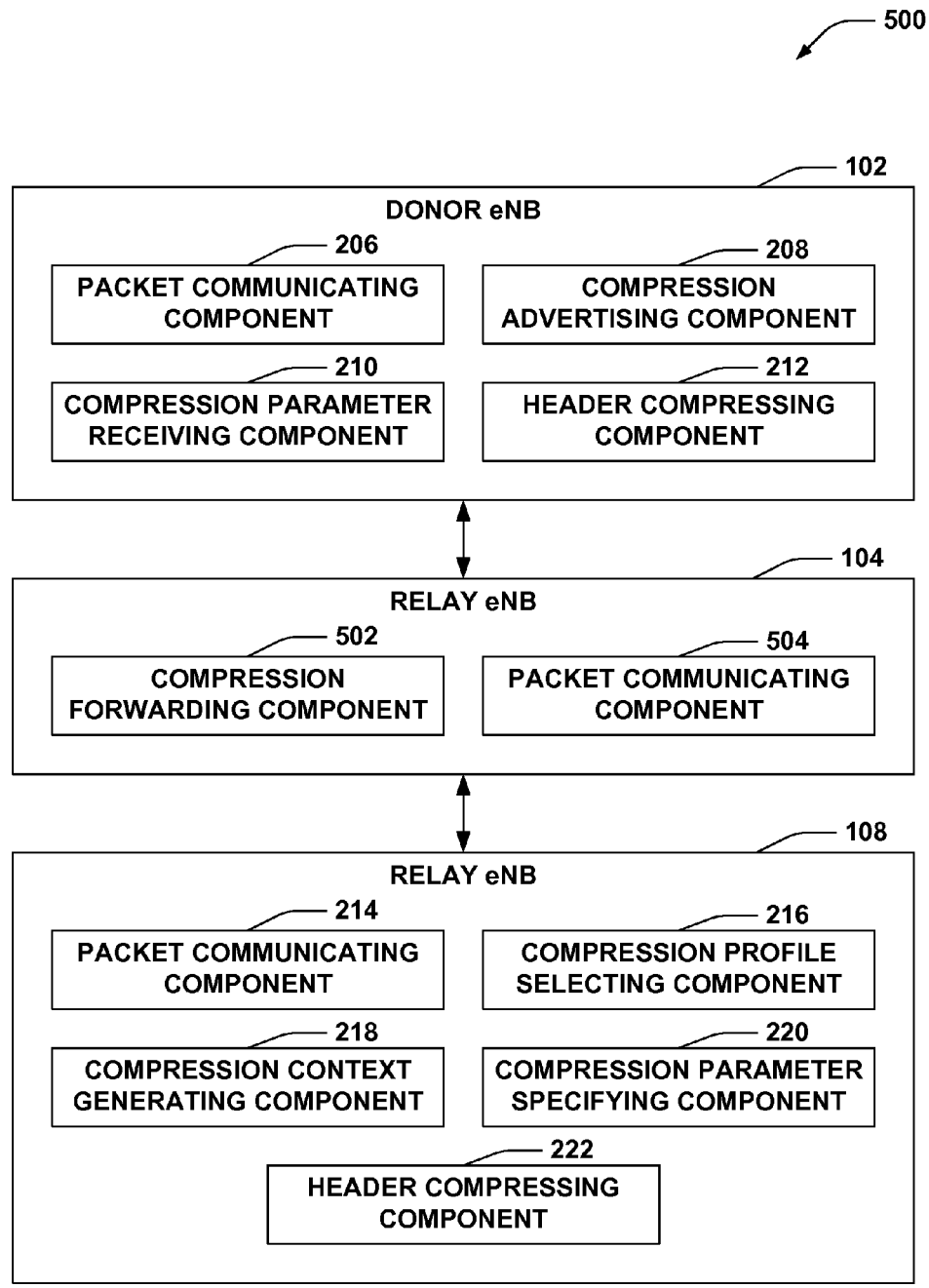
FIG. 5 is an illustration of an example wireless communications system that facilitates compressing headers related to multiple relay nodes.

Referring to FIG. 5, a wireless communication system 500 is illustrated that facilitates compressing packets in multi-hop relay configurations. System 500 includes a donor eNB 102 that provides one or more relay eNBs, such as relay eNB 104, with access to a core network 106. Similarly, relay eNB 104 can provide one or more disparate relay eNBs, such as relay eNB 108, or UEs with access to the core network 106 via donor eNB 102, as described above. Thus, a device communicating with relay eNB 108 can have multiple hops to donor eNB 102, and thus a packet can have multiple headers related to routing the packet among relay eNB 108, relay eNB 104, and donor eNB 102, for example.

Donor eNB 102, as described, can include a packet communicating component 206 that receives a packet from one or more devices in a wireless network (not shown) and transmits the packet, or a compressed version thereof, to a related relay eNB, and/or receives a packet from the relay eNB and transmits the packet to one or more wireless network components. Donor eNB 102 also comprises a compression advertising component 208 that signals one or more compression profiles or other parameters supported by donor eNB 102, a compression parameter receiving component 210 that obtains one or more parameters related to compressing headers of packets for one or more access points, and a header compressing component 212 that compresses one or more packets for transmitting to the one or more access points or decompresses one or more packets from the one or more access points according to the one or more parameters. Relay eNB 104 comprises a compression forwarding component 502 that can communicate one or more compression profiles that can be used at a donor eNB to one or more downstream nodes, and a packet communicating component 504 that receives packets from a downstream relay eNB or UE for transmission to a donor eNB, and/or receives packets from the donor eNB for transmission to the downstream relay eNB or UE.

Relay eNB 108 comprises a packet communicating component 214 that receives a packet from an upstream relay eNB and transmits the packet, or a decompressed version thereof, to one or more downstream devices (e.g., a relay eNB, UE, etc.), and/or receives a packet from the one or more downstream devices and transmits the packet to the upstream relay eNB. Relay eNB 108 also comprises a compression profile selecting component 216 that determines a compression profile advertised by one or more access points to apply to one or more packet headers for transmission to the one or more access points, and a compression context generating component 218 that creates a context identifier for associating to one or more compressed packet headers. Relay eNB 108 additionally can comprise a compression parameter specifying component 220 that indicates one or more parameters for associating to the context identifier for subsequently decompressing the one or more compressed packet headers, and a header compressing component 222 that compresses or decompresses one or more subsequent packets based at least in part on a context identifier and the one or more parameters.

According to an example, as described, compression advertising component 208 can signal compression profiles that can be used at donor eNB 102 to compress one or more packets to relay eNB 104. Compression forwarding component 502 can obtain an indication of the compression profiles and can transmit the compression profiles related to donor eNB 102 to relay eNB 108. As described previously, for example, compression profile selecting component 216 can choose a profile for compressing routing headers related to a downstream device. Compression context generating component 218 can create a compression context identifier, and compression parameter specifying component 220 can determine one or more parameters related to relay eNB 108 and/or the downstream device for associating with the compression context identifier and compression profile. Compression parameter specifying component 220 can transmit the one or more parameters, compression context identifier, and an indication of the selected compression profile to donor eNB 102 via relay eNB 104.

In this example, compression forwarding component 502 can receive the one or more parameters, compression context identifier, and selected compression profile and forward to donor eNB 102. In addition, for example, compression forwarding component 502 can increment a hop counter that can be transmitted along with the information to allow donor eNB to associate the compression context identifier in a header based on the number of hops between the relay eNB 108 and donor eNB 102. As described, compression parameter receiving component 210 can obtain the information and can associate the one or more parameters to the selected compression profile, the compression context identifier, and the hop count. Thus, packet communicating component 206 can receive a packet from an upstream network component (not shown). Compression parameter receiving component 210 can determine whether one or more parameters in one or more headers of the packet match those received from relay eNB 108 at least in part by looking at headers that correlate to the hop count. If so, header compressing component 212 can apply the compression profile associated with the one or more parameters to the one or more headers of the packet, and can indicate the related compression context identifier in the packet (e.g., in the corresponding header or a disparate header related to compressing the corresponding header). Packet communicating component 206 can transmit the packet to relay eNB 104 based at least in part on a disparate header of the packet.

In this example, it is to be appreciated that relay eNB 104 may not initialize compression with donor eNB 102, and thus the packet received at compression forwarding component 502 can have at least one uncompressed routing header and at least one compressed routing header (e.g., that related to relay eNB 108). In another example, however, relay eNB 104 can similarly initialize compression, and header compressing component 212 can compress the routing header related to relay eNB 104 and that related to relay eNB 108 using the selected compression profile for each, and including the compression context identifier for each. Thus, relay eNB 104 can decompress its routing header from the packet received at packet communicating component 504.

In either case, relay eNB 104 can process its routing header and remove the routing header from the packet, and packet communicating component 504 can transmit the packet to relay eNB 108 (e.g., based at least in part on its routing header). As described, for example, packet communicating component 214 can obtain the packet, and compression context generating component 218 can determine whether the packet includes a compressed header based at least in part on identifying a compression context identifier in the packet. Header compressing component 222 can decompress the header based at least in part on placing the one or more parameters previously associated to the compression context identifier in the compressed header and/or generating a new header based at least in part on the one or more parameters. In addition, as described header compressing component 222 can decompress any compressed non-static values in the header as well.

In another example, packet communicating component 214 can obtain a packet from a downstream device (e.g., another relay eNB, a UE, etc.), for which compression parameter specifying component 220 can have provided related parameters, a compression context identifier, a compression profile, a related hop count (e.g., incremented at each relay eNB between relay eNB 108 and donor eNB 102), etc., to donor eNB 102. In this regard, as described, header compressing component 222 can compress a header of the packet, and packet communicating component 214 can transmit the packet to relay eNB 104. Depending on whether relay eNB 104 implements header compression and/or has provided parameters, a compression context identifier, a selected compression profile, and/or a related hop count to donor eNB 102 related to relay eNB 108, for example, relay eNB 104 can compress or not compress a disparate header in the packet. In either case, packet communicating component 504 can transmit the packet to donor eNB 102.

Packet communicating component 206 can obtain the packet, and compression parameter receiving component 210 can determine whether the packet includes headers compressed by relay eNB 108 (and/or one or more disparate relay eNBs). Thus, for example, compression parameter receiving component 210 can determine whether a compression context identifier in any of the headers (if present) correspond to an identifier associated to one or more parameters and/or a compression profile, as described. In addition, compression parameter receiving component 210 can determine such based further at least in part on a hop count related to the compression context identifier and a position of a related header in the packet (e.g., an index of the related header). If compression parameter receiving component 210 matches one or more compression context identifiers in the packet to those associated to parameters and/or compression profiles by compression parameter receiving component 210, header compressing component 212 can decompress the headers, as described, according to the compression profile. In one example, where relay eNB 108 and relay eNB 104 compressed a header, donor eNB 102 can respectively decompress the headers based at least in part on the compression context identifier, parameters, and compression profile received from relay eNB 108 and 104, as described above (e.g., as well as the hop count).

Figure 6:
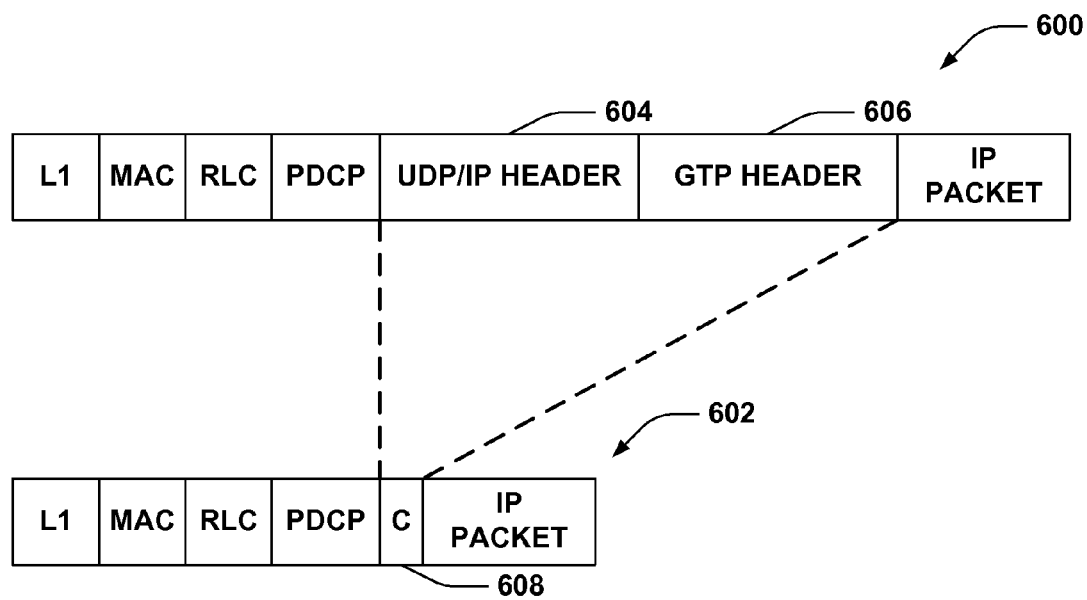
FIG. 6 is an illustration of example packets according to aspects described herein.

Referring to FIG. 6, example packets 600 and 602 are shown according to aspects described herein. Packet 600 can be a packet received at a donor eNB and/or relay eNB before compression. Packet 600 can comprise a plurality of headers for different layers of communication, as described, which can include a UDP/IP header 604 and a GTP header 606. For example, the UDP/IP header 604 and GTP header 606 can include static data, such as an IP address of a related relay node or PGW/SGW, a TEID thereof to facilitate routing packet 600, and IP protocol version, and/or the like. In addition, the UDP/IP header 604 and GTP header 606 can include non-static data as well, such as a sequence number. The UDP/IP header 604 and GTP header 606, as described, can be compressed into compressed header 608 of packet 602. Compressing can include removing the static data from the UDP/IP header 604 and/or GTP header 606. Compressing can also include applying compression to non-static data (e.g., removing a number of least significant bits of a sequence number). In either case, compressed header 608 can include a compression context identifier previously associated to at least a portion of the static data to facilitate identifying packet 602 and decompressing the compressed header 608 to a UDP/IP and/or GTP header.

Figure 7:
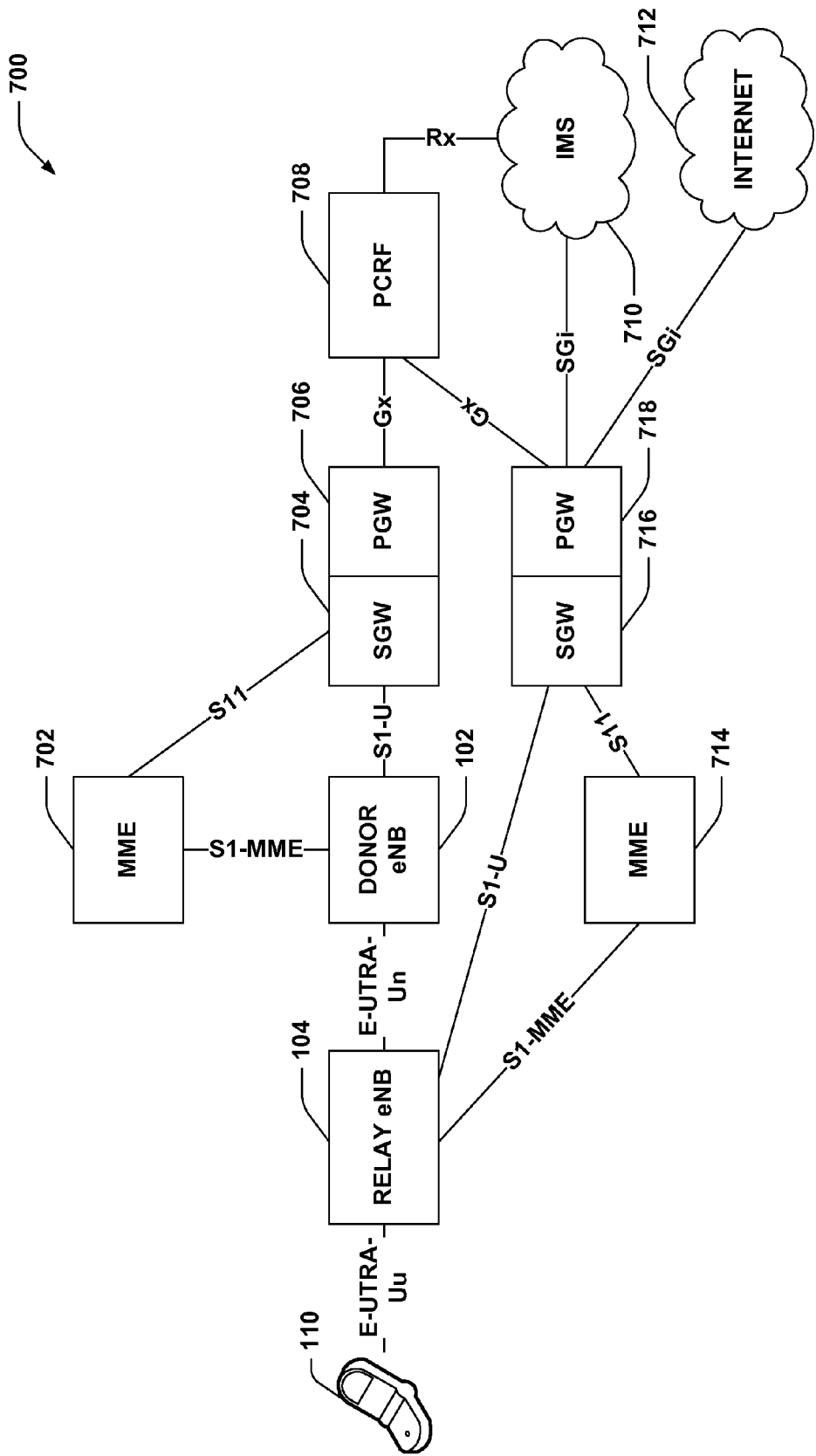
FIG. 7 is an illustration of an example wireless communications system that utilizes relay nodes to provide access to a wireless network.

Now turning to FIG. 7, an example wireless communication network 700 that provides IP relay functionality is depicted. Network 700 includes a UE 110 that communicates with a relay eNB 104, as described, to receive access to a wireless network. Relay eNB 104 can communicate with a donor eNB 102 to provide access to a wireless network, and as described, donor eNB 102 can communicate with an MME 702 and/or SGW 704 that relate to the relay eNB 104. SGW 704 can connect to or be coupled with a PGW 706, which provides network access to SGW 704 and/or additional SGWs. PGW 706 can communicate with a policy and charging rules function (PCRF) 708 to authenticate/authorize relay eNB 104 to use the network, which can utilize an IP multimedia subsystem (IMS) 710 to provide addressing to the relay eNB 104.

According to an example, SGW 704 and PGW 706 can also communicate with SGW 716 and PGW 718, which can be related to UE 110. For example, SGW 716 and/or PGW 718 can assign an IP address to UE 110 and can communicate therewith via SGW 704 and PGW 706, donor eNB 102, and relay eNB 104. Communications between UE 110 and SGW 716 and/or PGW 718 can be tunneled through the nodes. SGW 704 and PGW 706 can similarly tunnel communications between UE 110 and MME 714. PGW 718 can similarly communicate with a PCRF 708 to authenticate/authorize UE 110, which can communicate with an IMS 710. In addition, PGW 718 can communicate directly with the IMS 710 and/or internet 712.

In an example, UE 110 can communicate with the relay eNB 104 over one or more radio protocol interfaces, such as an E-UTRA-Uu interface, as described, and the relay eNB 104 can communicate with the donor eNB 102 using one or more radio protocol interfaces, such as an E-UTRA-Un or other interface. As described, relay eNB 104 can add a UDP/IP and/or GTP header related to SGW 704 and/or PGW 706 to packets received from UE 110. Moreover, relay eNB 104 can compress the UDP/IP and GTP headers, as described herein, and can forward the packets to donor eNB 102 along with a context identifier. Donor eNB 102 communicates with the MME 702 using an S1-MME interface and the SGW 704 and PGW 706 over an S1-U interface, as depicted. For example, donor eNB 102 can decompress the packets according to the compression context identifier and can similarly add an UDP/IP and/or GTP header to the packets and forward to MME 702 or SGW 704.

SGW 704 and/or PGW 706 can utilize the UDP/IP and/or GTP headers to route the packets within the core network. For example, as described, SGW 704 and/or PGW 706 can receive the packets and remove the outer UDP/IP and/or GTP header, which relates to the SGW 704 and/or PGW 706. SGW 704 and/or PGW 706 can process the next UDP/IP and/or GTP header to determine a next node to receive the packets, which can be SGW 716 and/or PGW 718, which relate to UE 110. Similarly, SGW 716 and/or PGW 718 can obtain downlink packets related to UE and can include an UDP/IP header and/or GTP header related to communicating the packets to relay eNB 104 for providing to UE 110. SGW 716 and/or PGW 718 can forward the packets to SGW 704 and/or PGW 706, which relate to relay eNB 104. SGW 704 and/or PGW 706 can further include an additional UDP/IP and/or GTP header in the packets related to donor eNB 102.

SGW 704 and/or PGW 706 can communicate the packets to donor eNB 102 over a tunnel (e.g., by including one or more parameters in the GTP header included by SGW 704 and/or PGW 706). Donor eNB 102 can remove the outer GTP and/or UDP/IP header included by SGW 704 and/or PGW 706 and can determine a next node to receive the packets. Donor eNB 102 can compress the packets according to a compression profile selected by relay eNB 104, as described, and can transmit the packets with a related compression context identifier to relay eNB 104 over a radio bearer related to a GTP tunnel. Relay eNB 104 can receive the packets and can decompress the headers according to the compression context identifier, as described. Relay eNB 104 can also determine a next node to receive the packets and/or a bearer over which to transmit the packets based at least in part on one or more parameters in the next UDP/IP or GTP header, the radio bearer over which the packets are received, etc. Relay eNB 104 can remove the UDP/IP and GTP headers related to relay eNB 104, compress remaining headers, in one example, and transmit the packets to UE 110. UE 110, as described, can decompress compressed headers at a PDCP layer for processing thereof by an upper communication layer.

Figure 8:
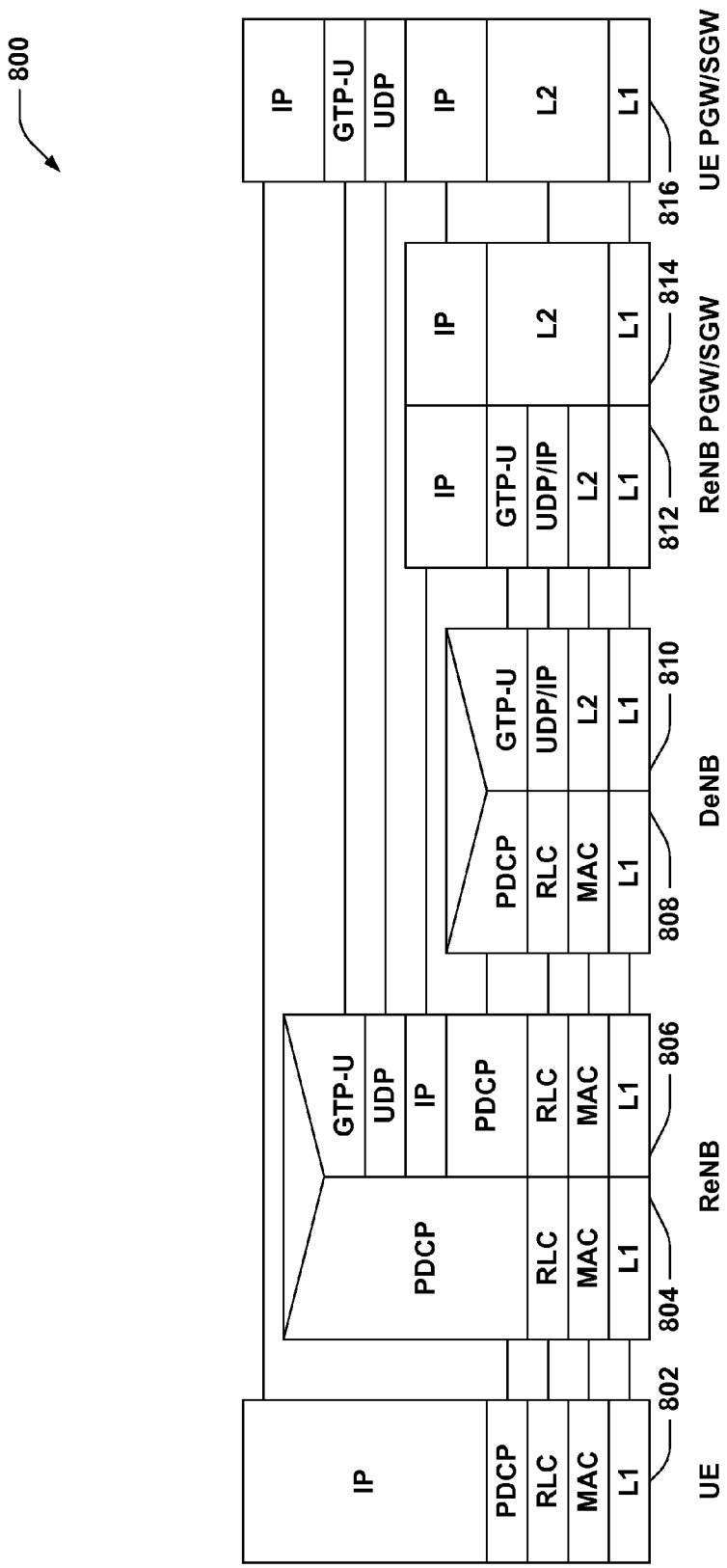
FIG. 8 is an illustration of example protocol stacks that facilitate providing relay node functionality.

Referring to FIG. 8, example protocol stacks 800 are illustrated that facilitate communicating in a wireless network to provide relay functionality. A UE protocol stack 802 is shown comprising an L1 layer, MAC layer, an RLC layer, a PDCP layer, and an IP layer. A relay eNB (ReNB) access link protocol stack 804 is depicted having an L1 layer, MAC layer, RLC layer, and PDCP layer, along with an ReNB backhaul link protocol stack 806 having an L1 layer, MAC layer, RLC layer, PDCP layer, IP layer, UDP layer, and GTP-U layer. A donor eNB (DeNB) access link protocol stack 808 is also shown having an L1 layer, MAC layer, RLC layer, and a PDCP layer, along with a DeNB backhaul link protocol stack 810 having an L1 layer, L2 layer, a UDP/IP layer, and a GTP-U. In addition, an ReNB PGW/SGW access link protocol stack 812 is shown having an L1 layer, L2 layer, UDP/IP layer, GTP-U layer, and IP layer, as well as a ReNB PGW/SGW backhaul link protocol stack 814 including an L1 layer, L2 layer, and IP layer. Moreover, a UE PGW/SGW protocol stack 816 is depicted having an L1 layer, L2, layer, IP layer related to ReNB PGW/SGW, UDP layer, GTP-U layer, and an IP layer related to a UE.

According to an uplink communication example, a UE can communicate with an ReNB for IP communications to a UE PGW/SGW. In this regard, UE can communicate over L1, MAC, RLC, and PDCP layers with the ReNB (e.g., using a EUTRA-Uu interface), as shown between protocol stacks 802 and 804. The UE can tunnel IP layer communications through the ReNB and other entities to the UE PGW/SGW, which assigns an IP address to the UE, as shown between protocol stacks 802 and 816. To facilitate such tunneling, the ReNB can insert an IP header to communicate access link packets to an ReNB PGW/SGW through one or more other nodes on the backhaul link, as shown between protocol stacks 806 and 812. In addition, ReNB inserts GTP-U and UDP headers related to the UE PGW/SGW, as shown between protocol stacks 806 and 816, to facilitate the tunneling. It is to be appreciated that additional ReNBs can be present, and can each add similar headers to facilitate tunneling.

Moreover, ReNB and can communicate with a DeNB over L1, MAC, RLC, and PDCP layers (e.g., using an EUTRA-Un interface), as shown between protocol stacks 806 and 808. The DeNB can remove the PDCP, RLC, and MAC layers, which facilitate air communications, and can subsequently communicate with ReNB PGW/SGW over L1, L2, UDP/IP, and GTP-U layers, as shown between protocol stacks 810 and 812. In this regard, DeNB can add the GTP-U and UDP/IP layers related to ReNB the PGW/SGW to tunnel the GTP-U, UDP, and IP layers of the ReNB to the ReNB PGW/SGW.

ReNB PGW/SGW can remove the GTP-U and UDP/IP layers, and can subsequently communicate with UE PGW/SGW over L1, L2, and IP layers to tunnel IP communications from UE, as described. Thus, as described, IP and/or GTP headers between the ReNB and DeNB can be compressed and decompressed according to a compression context identifier, one or more parameters, a selected compression profile, etc., communicated to the DeNB by the ReNB (and/or additional ReNBs). It is to be appreciated that similar procedures and compression/decompression can be utilized to tunnel downlink packets from the UE PGW/SGW to the UE, as described.

Figure 9:
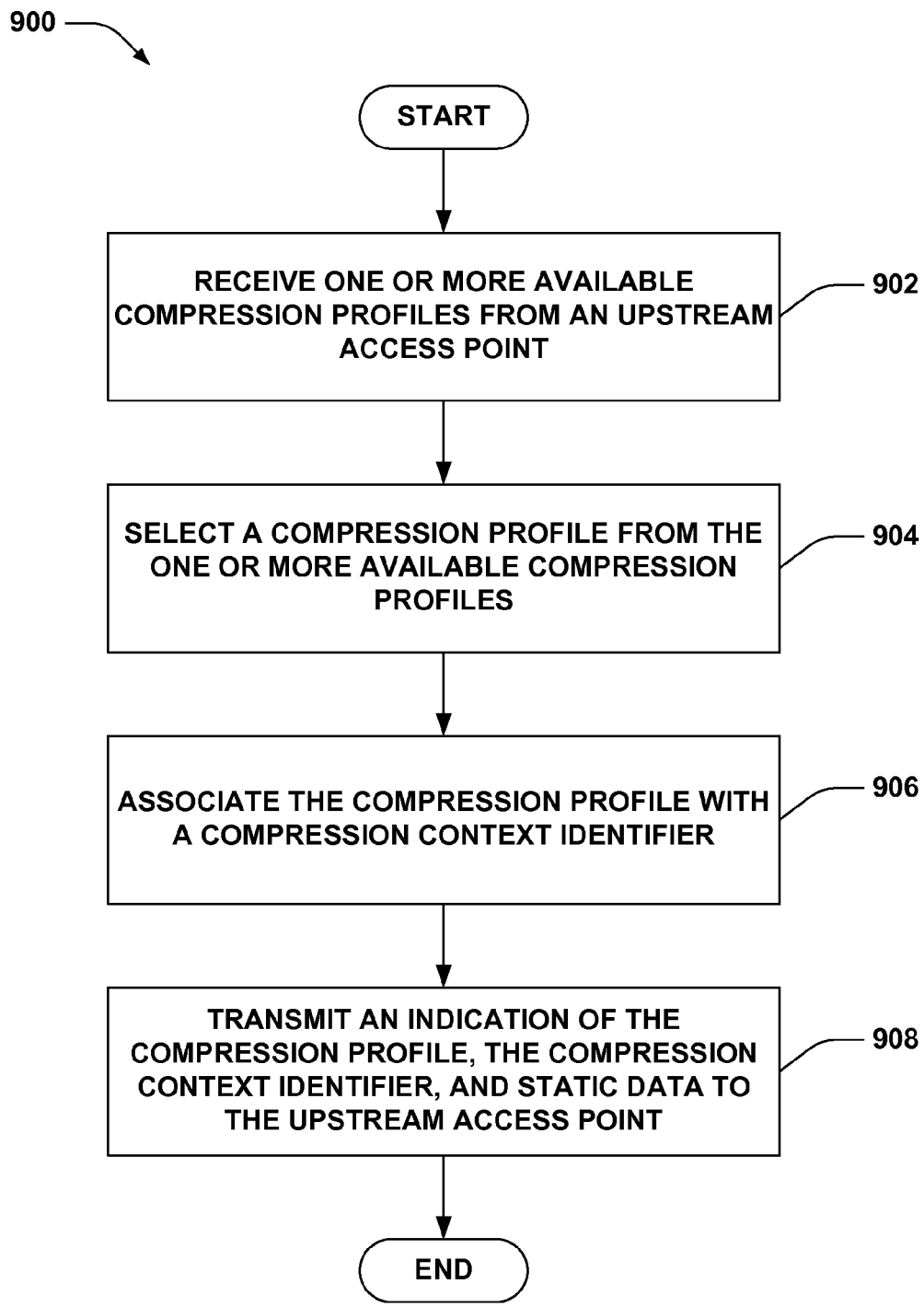
FIG. 9 is an illustration of an example methodology for providing compression parameters to an upstream access point.
Figure 10:
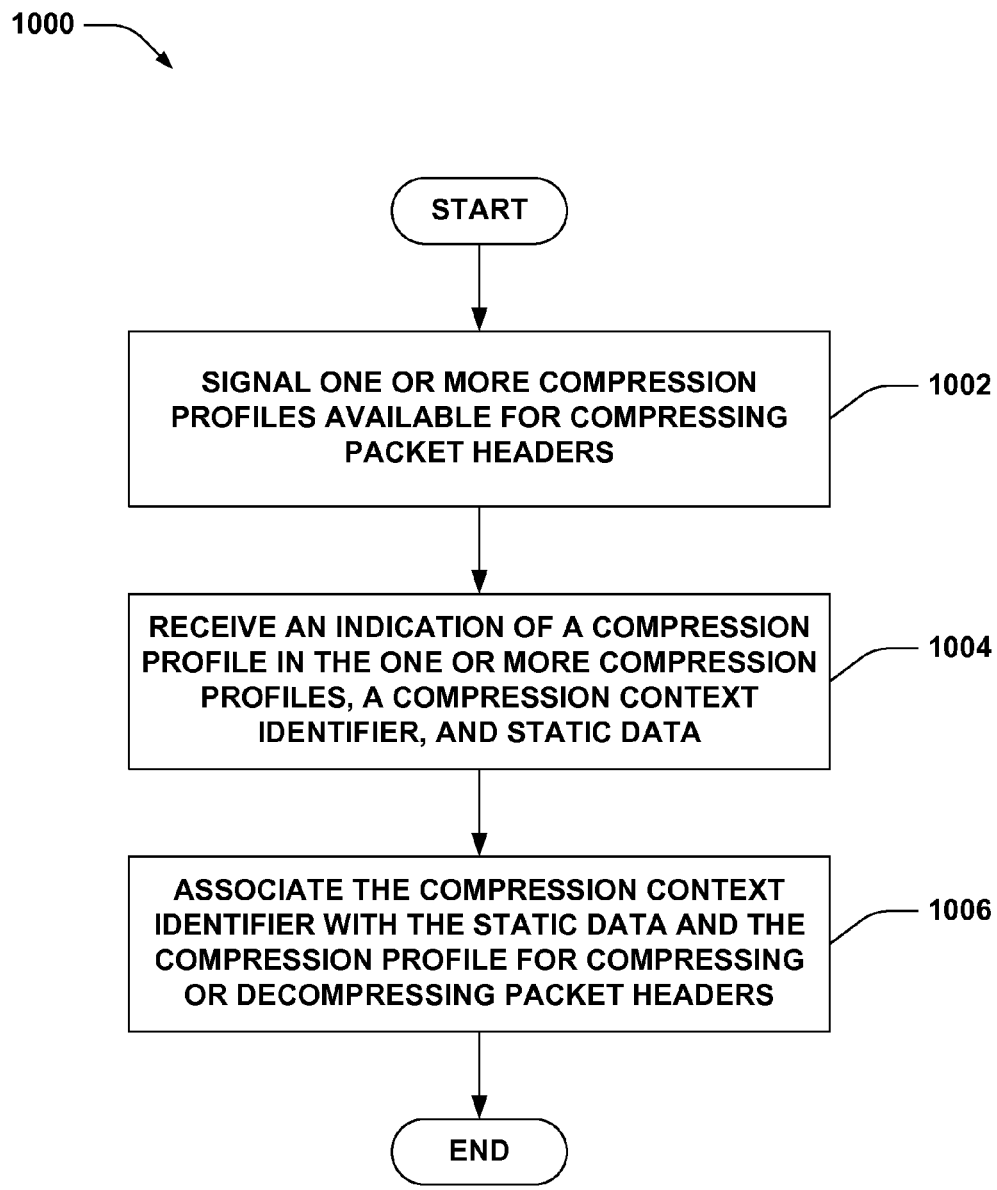
FIG. 10 is an illustration of an example methodology that utilizes received compression parameters for compressing/decompressing one or more packet headers.

Referring to FIGS. 9-10, example methodologies relating to compressing routing headers of packets between access points are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

Turning to FIG. 9, an example methodology 900 is displayed that facilitates indicating one or more parameters to an access point for subsequent compression/decompression of one or more packet headers. At 902, one or more available compression profiles can be received from an upstream access point. As described, for example, the upstream access point can advertise the one or more compression profiles in one or more RRC or similar signals. At 904, a compression profile can be selected from the one or more available compression profiles. For example, the compression profile can be selected for compressing packets related to one or more downstream access points or devices. At 906, the compression profile can be associated with a compression context identifier. As described, for example, the compression context identifier can be generated to identify packets related to the one or more downstream devices, and can be generated randomly, pseudo-randomly (e.g., based on an identifier of the one or more downstream devices), according to a specification, and/or the like. At 908, an indication of the compression profile, the compression context identifier, and static data can be transmitted to the upstream access point. The static data, as described, can be one or more parameters that can be used to identify packets for the one or more downstream devices. Thus, based at least in part on locating packets with the static data, the upstream access point can compress one or more headers of the packets according to the related compression profile and based at least in part on the compression context identifier. Similarly, packets having the static data can be compressed for transmitting to the upstream access point based at least in part on the compression profile and compression context identifier.

Referring to FIG. 10, illustrated is an example methodology 1000 that facilitates compressing/decompressing packet headers based at least in part on one or more received parameters. At 1002, one or more compression profiles available for compressing packet headers can be signaled. In this regard, a downstream access point can receive the compression profiles and can select one or more compression profiles for compressing/decompressing packet headers. At 1004, an indication of a compression profile in the one or more compression profiles can be received along with a compression context identifier and static data. The static data, as described, can relate to one or more parameters for identifying packets related to the compression context identifier and compression profile. In this regard, at 1006, the compression context identifier can be associated with the static data and the compression profile for compressing or decompressing packet headers. Thus, in an example, a packet can be received and one or more parameters in the packet can be compared to the static data. If the parameters match the static data, one or more headers of the packet can be compressed based on the compression profile, and the compression context identifier can be associated with the one or more compressed headers, as described. Similarly, for example, a packet received from a downstream access point can be decompressed based at least in part on determining the static values associated with a compression context identifier in at least one compressed header of the packet, as described.

It will be appreciated that, in accordance with one or more aspects described herein, inferences can be made regarding determining whether one or more parameters of a received packet are associated with a compression context identifier, and/or the like, as described. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 11:
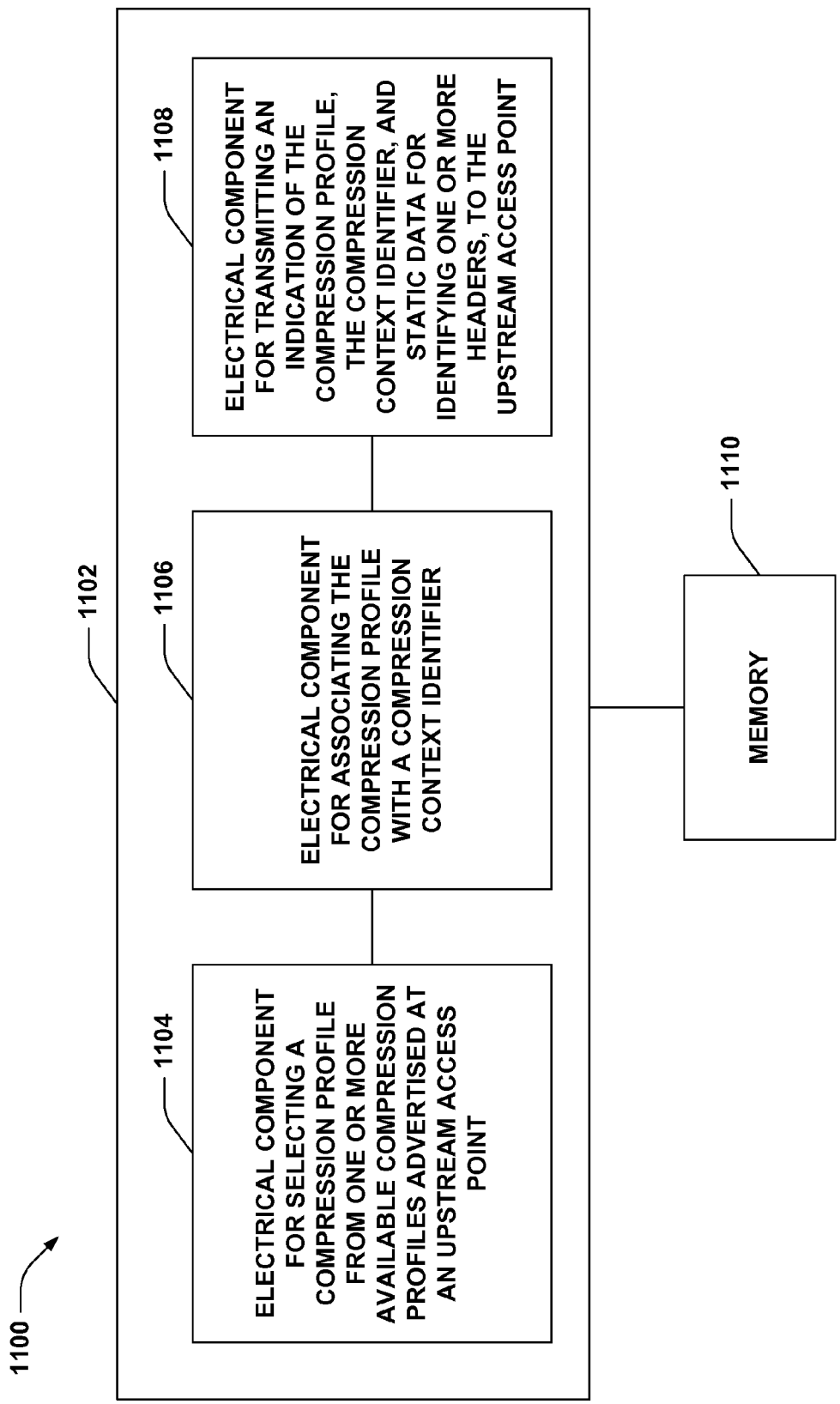
FIG. 11 is an illustration of an example system that facilitates providing compression parameters to an upstream access point.

With reference to FIG. 11, illustrated is a system 1100 that transmits parameters for compressing/decompressing packet headers at an upstream access point. For example, system 1100 can reside at least partially within a base station, mobile device, etc. It is to be appreciated that system 1100 is represented as including functional blocks, which can be functional blocks that represent functions implemented by a processor, software, or combination thereof (e.g., firmware). System 1100 includes a logical grouping 1102 of electrical components that can act in conjunction. For instance, logical grouping 1102 can include an electrical component for selecting a compression profile from one or more available compression profiles advertised at an upstream access point 1104. As described, for example, the compression profile can be selected for compressing packets related to a downstream access point or other device. In addition, logical grouping 1102 can comprise an electrical component for associating the compression profile with a compression context identifier 1106.

As described, for example, the compression context identifier can be additionally associated with static data for identifying related packet headers to be compressed and/or decompressed. Moreover, logical grouping 1102 can comprise an electrical component for transmitting an indication of the compression profiles, the compression context identifier, and static data for identifying the one or more headers, to the upstream access point 1108. Thus, for example, where packets are received at the upstream access point having header parameters that match the static data, the packets can be compressed according to the compression profile and/or compression context identifier. Similarly, packets transmitted to the upstream access point can be compressed for transmitting to the upstream access point. Additionally, system 1100 can include a memory 1110 that retains instructions for executing functions associated with the electrical components 1104, 1106, and 1108. While shown as being external to memory 1110, it is to be understood that one or more of the electrical components 1104, 1106, and 1108 can exist within memory 1110.

Figure 12:
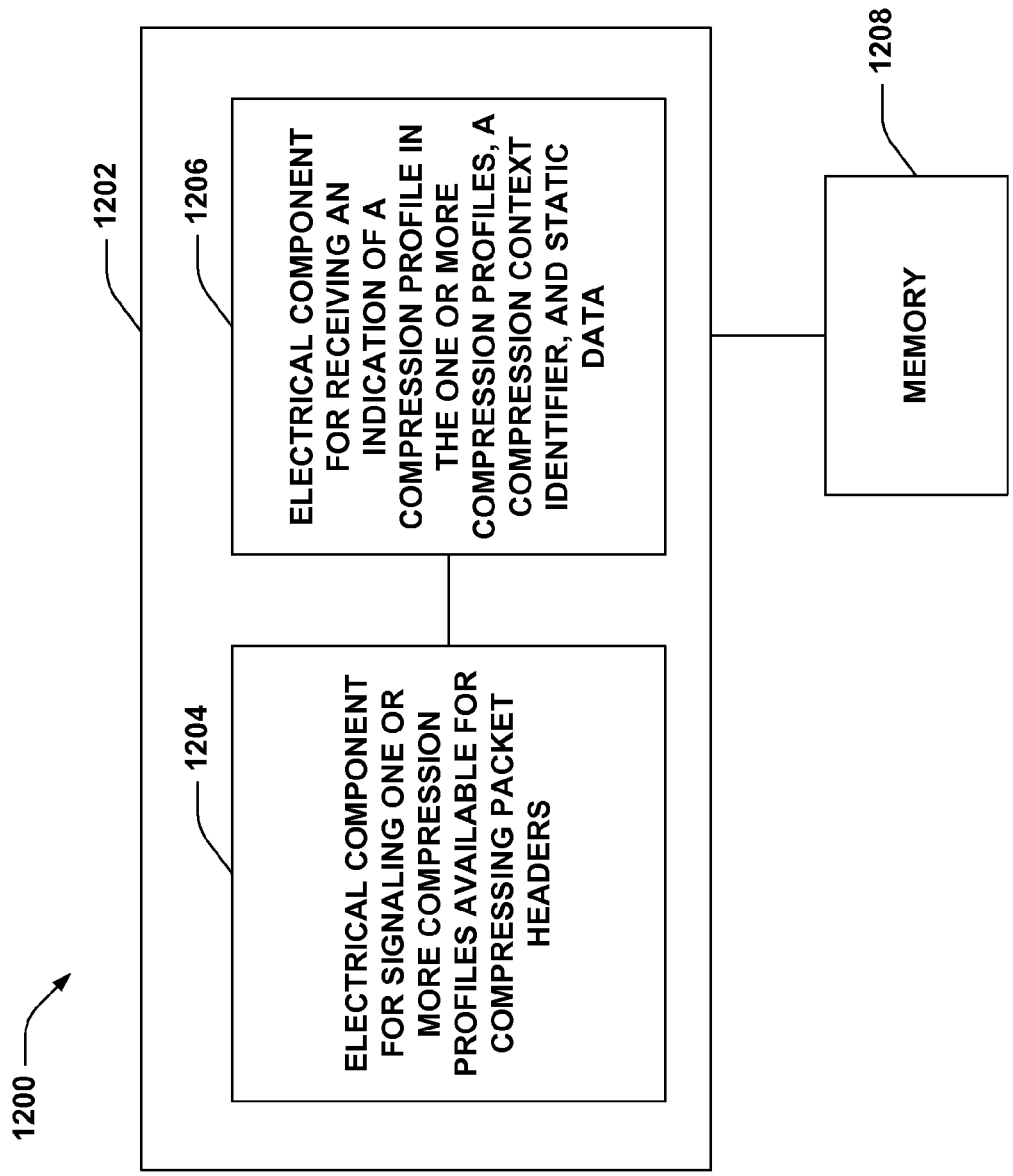
FIG. 12 is an illustration of an example system that facilitates compressing/decompressing one or more packet headers according to received compression parameters.

With reference to FIG. 12, illustrated is a system 1200 that compresses and/or decompresses packets based at least in part on one or more received parameters. For example, system 1200 can reside at least partially within a base station, mobile device, etc. It is to be appreciated that system 1200 is represented as including functional blocks, which can be functional blocks that represent functions implemented by a processor, software, or combination thereof (e.g., firmware). System 1200 includes a logical grouping 1202 of electrical components that can act in conjunction. For instance, logical grouping 1202 can include an electrical component for signaling one or more compression profiles available for compressing packet headers 1204. As described, for example, the available compression profiles can be advertised to one or more access points using RRC signaling. Moreover, logical grouping 1202 can comprise an electrical component for receiving an indication of a compression profile in the one or more compression profiles, a compression context identifier, and static data 1206. In this regard, as described, system 1200 can subsequently compress packets based at least in part on identifying at least a portion of the static data in one or more headers, decompress packets based at least in part on identifying the compression context identifier in the packets, and/or the like, as described. Additionally, system 1200 can include a memory 1208 that retains instructions for executing functions associated with the electrical components 1204 and 1206. While shown as being external to memory 1208, it is to be understood that one or more of the electrical components 1204 and 1206 can exist within memory 1208.

Figure 13:
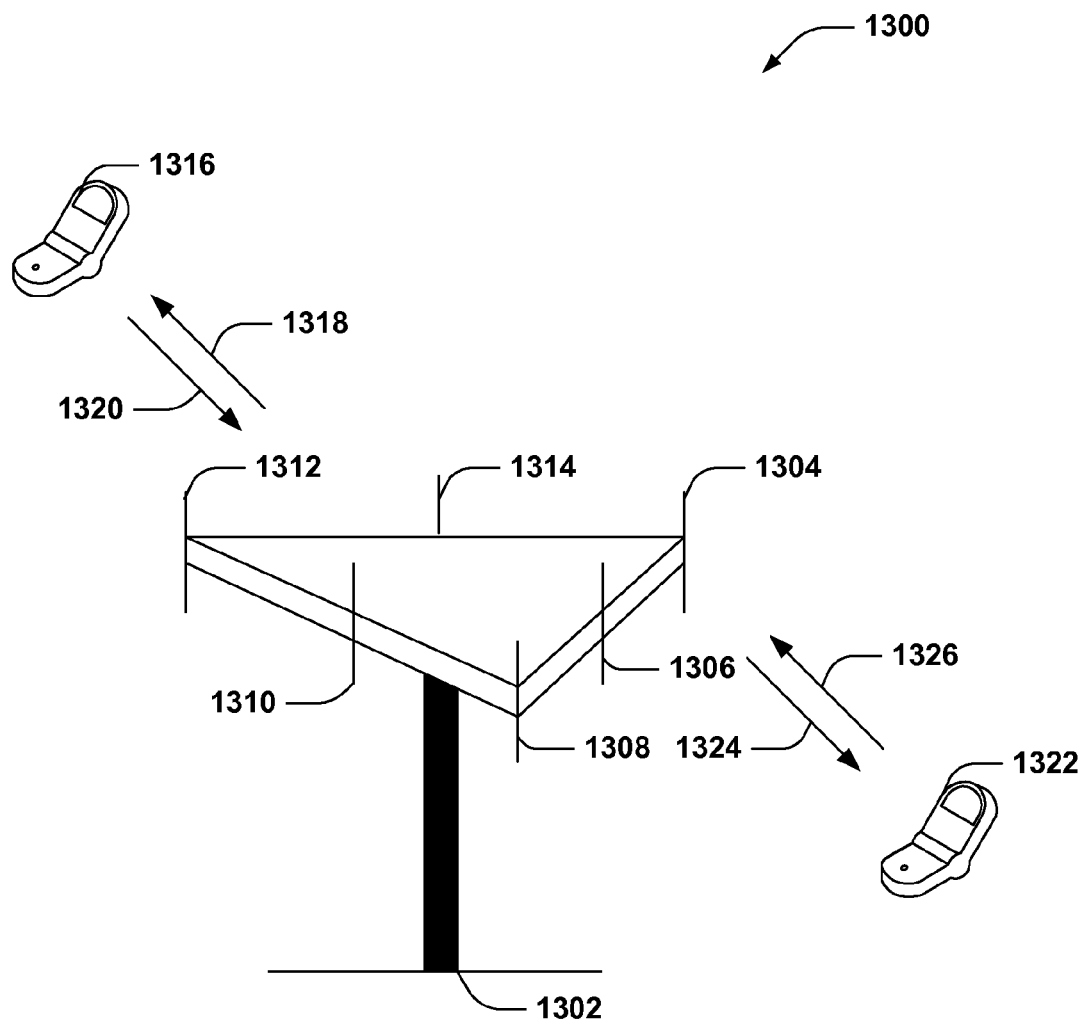
FIG. 13 is an illustration of a wireless communication system in accordance with various aspects set forth herein.

Referring now to FIG. 13, a wireless communication system 1300 is illustrated in accordance with various embodiments presented herein. System 1300 comprises a base station 1302 that can include multiple antenna groups. For example, one antenna group can include antennas 1304 and 1306, another group can comprise antennas 1308 and 1310, and an additional group can include antennas 1312 and 1314. Two antennas are illustrated for each antenna group; however, more or fewer antennas can be utilized for each group. Base station 1302 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 1302 can communicate with one or more mobile devices such as mobile device 1316 and mobile device 1322; however, it is to be appreciated that base station 1302 can communicate with substantially any number of mobile devices similar to mobile devices 1316 and 1322. Mobile devices 1316 and 1322 can be, for example, cellular phones, smart phones, laptops, handheld communication devices, handheld computing devices, satellite radios, global positioning systems, PDAs, and/or any other suitable device for communicating over wireless communication system 1300. As depicted, mobile device 1316 is in communication with antennas 1312 and 1314, where antennas 1312 and 1314 transmit information to mobile device 1316 over a forward link 1318 and receive information from mobile device 1316 over a reverse link 1320. Moreover, mobile device 1322 is in communication with antennas 1304 and 1306, where antennas 1304 and 1306 transmit information to mobile device 1322 over a forward link 1324 and receive information from mobile device 1322 over a reverse link 1326. In a frequency division duplex (FDD) system, forward link 1318 can utilize a different frequency band than that used by reverse link 1320, and forward link 1324 can employ a different frequency band than that employed by reverse link 1326, for example. Further, in a time division duplex (TDD) system, forward link 1318 and reverse link 1320 can utilize a common frequency band and forward link 1324 and reverse link 1326 can utilize a common frequency band.

Each group of antennas and/or the area in which they are designated to communicate can be referred to as a sector of base station 1302. For example, antenna groups can be designed to communicate to mobile devices in a sector of the areas covered by base station 1302. In communication over forward links 1318 and 1324, the transmitting antennas of base station 1302 can utilize beamforming to improve signal-to-noise ratio of forward links 1318 and 1324 for mobile devices 1316 and 1322. Also, while base station 1302 utilizes beamforming to transmit to mobile devices 1316 and 1322 scattered randomly through an associated coverage, mobile devices in neighboring cells can be subject to less interference as compared to a base station transmitting through a single antenna to all its mobile devices. Moreover, mobile devices 1316 and 1322 can communicate directly with one another using a peer-to-peer or ad hoc technology as depicted. According to an example, system 1300 can be a multiple-input multiple-output (MIMO) communication system.

Figure 14:
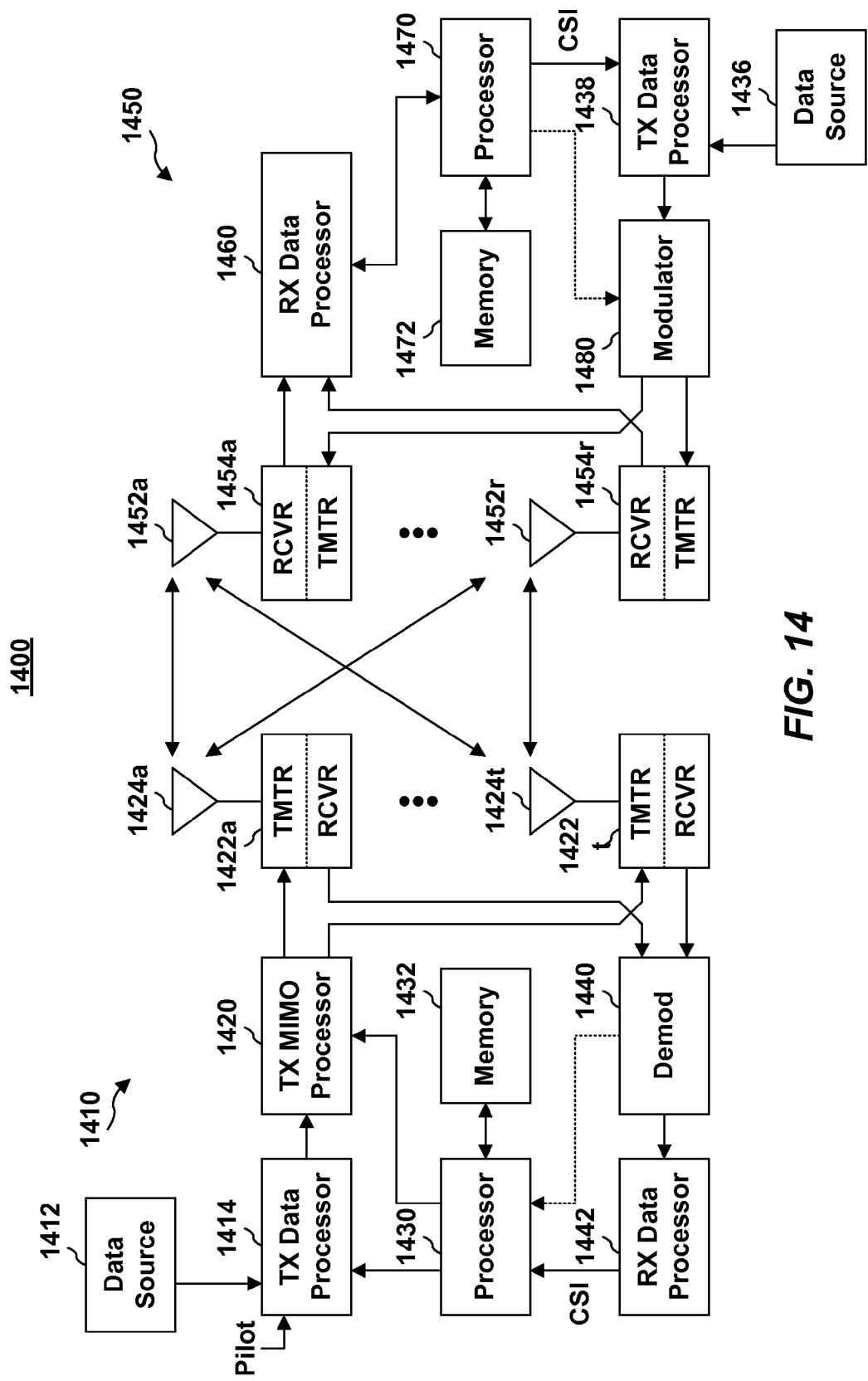
FIG. 14 is an illustration of an example wireless network environment that can be employed in conjunction with the various systems and methods described herein.

FIG. 14 shows an example wireless communication system 1400. The wireless communication system 1400 depicts one base station 1410 and one mobile device 1450 for sake of brevity. However, it is to be appreciated that system 1400 can include more than one base station and/or more than one mobile device, wherein additional base stations and/or mobile devices can be substantially similar or different from example base station 1410 and mobile device 1450 described below. In addition, it is to be appreciated that base station 1410 and/or mobile device 1450 can employ the systems (FIGS. 1-5, 7, and 11-13), packet structures (FIG. 6), protocol stacks (FIG. 8) and/or methods (FIGS. 9-10) described herein to facilitate wireless communication there between. For example, components or functions of the systems and/or methods described herein can be part of a memory 1432 and/or 1472 or processors 1430 and/or 1470 described below, and/or can be executed by processors 1430 and/or 1470 to perform the disclosed functions.

At base station 1410, traffic data for a number of data streams is provided from a data source 1412 to a transmit (TX) data processor 1414. According to an example, each data stream can be transmitted over a respective antenna. TX data processor 1414 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 1450 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1430.

The modulation symbols for the data streams can be provided to a TX MIMO processor 1420, which can further process the modulation symbols (e.g., for OFDM). TX MIMO processor 1420 then provides NT modulation symbol streams to NT transmitters (TMTR) 1422a through 1422t. In various embodiments, TX MIMO processor 1420 applies beamforming weights to the symbols of the data streams and to the antenna from which the symbol is being transmitted.

Each transmitter 1422 receives and processes a respective symbol stream to provide one or more analog signals, and further conditions (e.g., amplifies, filters, and upconverts) the analog signals to provide a modulated signal suitable for transmission over the MIMO channel. Further, NT modulated signals from transmitters 1422a through 1422t are transmitted from NT antennas 1424a through 1424t, respectively.

At mobile device 1450, the transmitted modulated signals are received by NR antennas 1452a through 1452r and the received signal from each antenna 1452 is provided to a respective receiver (RCVR) 1454a through 1454r. Each receiver 1454 conditions (e.g., filters, amplifies, and downconverts) a respective signal, digitizes the conditioned signal to provide samples, and further processes the samples to provide a corresponding "received" symbol stream.

An RX data processor 1460 can receive and process the NR received symbol streams from NR receivers 1454 based on a particular receiver processing technique to provide NT "detected" symbol streams. RX data processor 1460 can demodulate, deinterleave, and decode each detected symbol stream to recover the traffic data for the data stream. The processing by RX data processor 1460 is complementary to that performed by TX MIMO processor 1420 and TX data processor 1414 at base station 1410.

A processor 1470 can periodically determine which precoding matrix to utilize as discussed above. Further, processor 1470 can formulate a reverse link message comprising a matrix index portion and a rank value portion.

The reverse link message can comprise various types of information regarding the communication link and/or the received data stream. The reverse link message can be processed by a TX data processor 1438, which also receives traffic data for a number of data streams from a data source 1436, modulated by a modulator 1480, conditioned by transmitters 1454a through 1454r, and transmitted back to base station 1410.

At base station 1410, the modulated signals from mobile device 1450 are received by antennas 1424, conditioned by receivers 1422, demodulated by a demodulator 1440, and processed by a RX data processor 1442 to extract the reverse link message transmitted by mobile device 1450. Further, processor 1430 can process the extracted message to determine which precoding matrix to use for determining the beamforming weights.

Processors 1430 and 1470 can direct (e.g., control, coordinate, manage, etc.) operation at base station 1410 and mobile device 1450, respectively. Respective processors 1430 and 1470 can be associated with memory 1432 and 1472 that store program codes and data. Processors 1430 and 1470 can also perform computations to derive frequency and impulse response estimates for the uplink and downlink, respectively.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for wireless communication by a relay node, comprising:
   receiving one or more available compression profiles from an upstream access point;
   selecting a compression profile from the one or more available compression profiles;
   generating a compression context identifier for the compression profile;
   transmitting an indication of the compression profile, the compression context identifier, and static data for identifying one or more headers, without a compressed header, to the upstream access point that is connected to a core network;
   receiving a compressed packet from the upstream access point along with the compression context identifier; and
   decompressing the compressed packet based at least in part on determining the compression profile based at least in part on the compression context identifier,
   wherein the relay node is connected to the core network via the upstream access point.

2. The method of claim 1, wherein the decompressing is further based at least in part on retrieving the static data based at least in part on the compression context identifier, and associating the static data with at least one header in the compressed packet.

3. The method of claim 1, further comprising decompressing at least a portion of non-static data in the compressed packet.

4. The method of claim 1, further comprising receiving an acknowledgement of receiving the indication of the compression profile, the compression context identifier, and the static data from the upstream access point.

5. The method of claim 4, further comprising compressing one or more packets according to the compression profile based at least in part on the receiving the acknowledgement.

6. The method of claim 5, further comprising compressing at least a portion of non-static data in the one or more packets.

7. The method of claim 1, further comprising signaling to the upstream access point to remove the indication of the compression profile, the compression context identifier, and the static data.

8. The method of claim 1, further comprising initializing a timer upon transmitting the indication of the compression profile, the compression context identifier, and the static data to the upstream access point, wherein the timer relates to a period of time during which a compressed packet including the compression context identifier is expected.

9. The method of claim 8, further comprising retransmitting the indication of the compression profile, the compression context identifier, or the static data to the upstream access point based at least in part on expiration of the timer.

10. The method of claim 1, wherein the one or more headers relate to routing a packet to the relay node, and the static data comprises an internet protocol (IP) address or a tunnel endpoint identifier (TEID) related to the relay node.

11. The method of claim 1, wherein the one or more headers relate to routing a packet to a gateway, and the static data comprises an internet protocol (IP) address or a tunnel endpoint identifier (TEID) related to the gateway.

12. An apparatus of a relay node for compressing packet headers, comprising:
   at least one processor configured to:
      obtain indications of one or more available compression profiles from an upstream access point;
      determine a compression profile based at least in part on the indications of one or more available compression profiles;
      correlate the compression profile with a compression context identifier and static data for identifying one or more routing headers; and
      transmit an indication of the compression profile, the compression context identifier, and the static data, without a compressed header to the upstream access point that is connected to a core network, wherein the relay node is connected to the core network via the upstream access point;
      receive a compressed packet from the upstream access point along with the compression context identifier; and
      decompress the compressed packet based at least in part on determining the compression profile based at least in part on the compression context identifier;
   a memory coupled to the at least one processor.

13. The apparatus of claim 12, wherein the at least one processor decompresses further based at least in part on obtaining the static data based at least in part on the compression context identifier and associating the static data with at least one routing header in the compressed packet.

14. The apparatus of claim 12, wherein the at least one processor is further configured to receive an acknowledgement of receiving the indication of the compression profile, the compression context identifier, and the static data from the upstream access point.

15. The apparatus of claim 14, wherein the at least one processor is further configured to compress one or more packets according to the compression profile based at least in part on the acknowledgement.

16. The apparatus of claim 12, wherein the at least one processor is further configured to signal to the upstream access point to remove the indication of the compression profile, the compression context identifier, and the static data.

17. An apparatus of a relay node for compressing packet headers, comprising:
   means for selecting a compression profile from one or more available compression profiles advertised at an upstream access point;
   means for associating the compression profile with a compression context identifier;
   means for transmitting an indication of the compression profile, the compression context identifier, and static data for identifying one or more headers, without a compressed header, to the upstream access point that is connected to a core network;
   means for receiving a compressed packet from the upstream access point along with the compression context identifier; and
   means for decompressing the compressed packet based at least in part on determining the compression profile based at least in part on the compression context identifier,
   wherein the relay node is connected to the core network via the upstream access point.

18. The apparatus of claim 17, wherein the means for decompressing decompresses further based at least in part on retrieving the static data based at least in part on the compression context identifier and associating the static data with the one or more headers.

19. The apparatus of claim 17, wherein the means for transmitting receives an acknowledgement of receiving the indication of the compression profile, the compression context identifier, and the static data from the upstream access point.

20. The apparatus of claim 19, further comprising means for compressing one or more packets according to the compression profile based at least in part on the acknowledgement.

21. The apparatus of claim 17, wherein the means for transmitting further signals to the upstream access point to remove the indication of the compression profile, the compression context identifier, and the static data.

22. A computer program product for compressing packet headers, comprising:
a non-transitory computer-readable medium, comprising:
code for causing at least one computer to obtain indications of one or more available compression profiles from an upstream access point;
code for causing the at least one computer to determine a compression profile based at least in part on the indications of one or more available compression profiles;
code for causing the at least one computer to correlate the compression profile with a compression context identifier and static data for identifying one or more routing headers; and
code for causing the at least one computer to transmit an indication of the compression profile, the compression context identifier, and the static data, without a compressed header, to the upstream access point that is connected to a core network;
code for causing the at least one computer to receive a compressed packet from the upstream access point along with the compression context identifier; and
code for causing the at least one computer to decompress the compressed packet based at least in part on determining the compression profile based at least in part on the compression context identifier,
wherein a relay node is connected to the core network via the upstream access point.

23. The computer program product of claim 22, wherein the code for causing the at least one computer to decompress decompresses further based at least in part on obtaining the static data based at least in part on the compression context identifier and associating the static data with at least one routing header in the compressed packet.

24. The computer program product of claim 22, wherein the computer-readable medium further comprises code for causing the at least one computer to receive an acknowledgement of receiving the indication of the compression profile, the compression context identifier, and the static data from the upstream access point.

25. The computer program product of claim 24, wherein the computer-readable medium further comprises code for causing the at least one computer to compress one or more packets according to the compression profile based at least in part on the acknowledgement.

26. The computer program product of claim 22, wherein the computer-readable medium further comprises code for causing the at least one computer to signal to the upstream access point to remove the indication of the compression profile, the compression context identifier, and the static data.

27. An apparatus for compressing packet headers, comprising:
a compression profile selecting component for determining a compression profile from one or more available compression profiles advertised at an upstream access point;
a compression context generating component for associating the compression profile with a compression context identifier;
a compression parameter specifying component for transmitting an indication of the compression profile, the compression context identifier, and static data for identifying one or more headers, without a compressed header, to the upstream access point that is connected to a core network;
a packet communicating component for receiving a compressed packet from the upstream access point along with the compression context identifier; and
a header compressing component for decompressing the compressed packet based at least in part on determining the compression profile based at least in part on the compression context identifier, wherein a relay node is connected to the core network via the upstream access point.

28. The apparatus of claim 27, wherein the header compressing component decompresses further based at least in part on retrieving the static data based at least in part on the compression context identifier and associating the static data with the one or more headers.

29. The apparatus of claim 27, wherein the compression parameter specifying component receives an acknowledgement of receiving the indication of the compression profile, the compression context identifier, and the static data from the upstream access point.

30. The apparatus of claim 29, further comprising a header compressing component for compressing one or more packets according to the compression profile based at least in part on the acknowledgement.

31. The apparatus of claim 27, wherein the compression parameter specifying component further signals to the upstream access point to remove the indication of the compression profile, the compression context identifier, and the static data.

32. A method of wireless communication by a donor node connected to a core network, comprising:
signaling one or more compression profiles available for compressing packet headers;
receiving from a relay node an indication of a compression profile in the one or more compression profiles, a compression context identifier, and static data, without a compressed header, wherein the relay node is connected to the core network via the donor node; and
associating the compression context identifier with the static data and the compression profile to facilitate compressing or decompressing packet headers.

33. The method of claim 32, further comprising compressing a header of one or more packets according to the compression profile based at least in part on identifying at least a portion of the static data in the header.

34. The method of claim 33, wherein the compressing includes associating the compression context identifier with the header.

35. The method of claim 34, wherein the compressing includes removing at least a portion of the static data from the header.

36. The method of claim 33, further comprising compressing non-static data in the header.

37. The method of claim 32, further comprising decompressing a header of one or more packets according to the compression profile based at least in part on locating the compression context identifier in the header.

38. The method of claim 37, wherein the decompressing includes inserting the static data in the header based at least in part on locating the compression context identifier in the header.

39. The method of claim 37, further comprising decompressing at least a portion of non-static data in the header.

40. An apparatus of a donor node connected to a core network for compressing packet headers, comprising:
at least one processor configured to:
signal one or more compression profiles available for compressing packet headers;
obtain from a relay node an indication of a compression profile in the one or more compression profiles, a compression context identifier, and static data, without a compressed header, wherein the relay node is connected to the core network via the donor node; and
associate the compression context identifier with the static data and the compression profile to facilitate compressing or decompressing packet headers; and
a memory coupled to the at least one processor.

41. The apparatus of claim 40, wherein the at least one processor is further configured to compress a header of one or more packets according to the compression profile based at least in part on identifying at least a portion of the static data in the header.

42. The apparatus of claim 41, wherein the at least one processor compresses the header based at least in part on associating the compression context identifier with the header.

43. The apparatus of claim 42, wherein the at least one processor compresses the header further based at least in part on removing the static data from the header.

44. The apparatus of claim 40, wherein the at least one processor is further configured to decompress the header of one or more packets according to the compression profile based at least in part on locating the compression context identifier in the header.

45. The apparatus of claim 44, wherein the at least one processor decompresses the header at least in part by inserting the static data corresponding to the compression context identifier in the header.

46. An apparatus of a donor node connected to a core network for compressing packet headers, comprising:
means for signaling one or more compression profiles available for compressing packet headers;
means for receiving from a relay node an indication of a compression profile in the one or more compression profiles, a compression context identifier, and static data, without a compressed header, wherein the relay node is connected to the core network via the donor node; and
means for compressing a header of one or more packets according to the compression profile based at least in part on identifying at least a portion of the static data in the header.

47. The apparatus of claim 46, wherein the means for compressing compresses based at least in part on associating the compression context identifier with the header.

48. The apparatus of claim 47, wherein the means for compressing compresses based at least in part on removing at least a portion of the static data from the header.

49. The apparatus of claim 46, further comprising means for decompressing a header of one or more packets according to the compression profile based at least in part on locating the compression context identifier in the header.

50. The apparatus of claim 49, wherein the means for decompressing decompresses at least in part by inserting the static data in the header based at least in part on locating the compression context identifier in the header.

51. A computer program product for a donor node connected to a core network for compressing packet headers, comprising:
a non-transitory computer-readable medium, comprising:
code for causing at least one computer to signal one or more compression profiles available for compressing packet headers;
code for causing the at least one computer to obtain from a relay node an indication of a compression profile in the one or more compression profiles, a compression context identifier, and static data, without a compressed header, wherein the relay node is connected to the core network via the donor node; and
code for causing the at least one computer to associate the compression context identifier with the static data and the compression profile to facilitate compressing or decompressing packet headers.

52. The computer program product of claim 51, wherein the computer-readable medium further comprises code for causing the at least one computer to compress a header of one or more packets according to the compression profile based at least in part on identifying at least a portion of the static data in the header.

53. The computer program product of claim 52, wherein the code for causing the at least one computer to compress compresses the header based at least in part on associating the compression context identifier with the header.

54. The computer program product of claim 53, wherein the code for causing the at least one computer to compress compresses the header further based at least in part on removing the static data from the header.

55. The computer program product of claim 51, wherein the computer-readable medium further comprises code for causing the at least one computer to decompress the header of one or more packets according to the compression profile based at least in part on locating the compression context identifier in the header.

56. The computer program product of claim 55, wherein the code for causing the at least one computer to decompress decompresses the header at least in part by inserting the static data in the header.

57. An apparatus of a donor node connected to a core network for compressing packet headers, comprising:
a compression advertising component for signaling one or more compression profiles available for compressing packet headers; and
a compression parameter receiving component for obtaining from a relay node an indication of a compression profile in the one or more compression profiles, a compression context identifier, and static data, without a compressed header, wherein the relay node is connected to the core network via the donor node; and
a header compressing component for compressing a header of one or more packets according to the compression profile based at least in part on identifying at least a portion of the static data in the header.

58. The apparatus of claim 57, wherein the header compressing component compresses based at least in part on associating the compression context identifier with the header.

59. The apparatus of claim 58, wherein the header compressing component compresses based at least in part on removing at least a portion of the static data from the header.

60. The apparatus of claim 57, further comprising a header compressing component for decompressing a header of one or more packets according to the compression profile based at least in part on locating the compression context identifier in the header.

61. The apparatus of claim 60, wherein the header compressing component decompresses at least in part by inserting the static data in the header based at least in part on locating the compression context identifier in the header.

* * * * *